US012632321B2

(12) United States Patent
Mehmeri

(10) Patent No.: US 12,632,321 B2
(45) Date of Patent: May 19, 2026

(54) VIRTUAL AI ASSISTANT FOR VIRTUAL MEETINGS

(71) Applicant: Google LLC, Mountain View, CA (US)

(72) Inventor: Victor Dantas Mehmeri, Stockholm (SE)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/353,797

(22) Filed: Jul. 17, 2023

(65) Prior Publication Data

US 2025/0028579 A1     Jan. 23, 2025

(51) Int. Cl.
*G06F 3/048*     (2013.01)
*G06F 9/54*     (2006.01)
*H04L 51/02*     (2022.01)
*G06F 40/35*     (2020.01)

(52) U.S. Cl.
CPC ............. *G06F 9/543* (2013.01); *H04L 51/02* (2013.01); *G06F 40/35* (2020.01)

(58) Field of Classification Search
CPC ................................ H04L 51/02; G06F 40/35
See application file for complete search history.

(56) References Cited

U.S. PATENT DOCUMENTS

| | | |
|---|---|---|
| 9,148,394 B2 | 9/2015 | Lynch |
| 9,804,820 B2 | 10/2017 | Quast |
| 10,019,989 B2 | 7/2018 | Gauci |
| 10,075,676 B2 | 9/2018 | Segal |
| 10,176,808 B1 | 1/2019 | Lovitt |

| | | |
|---|---|---|
| 10,510,051 B2 | 12/2019 | Nelson |
| 10,522,151 B2 | 12/2019 | Cartwright |
| 10,586,539 B2 | 3/2020 | Raanani |
| 10,860,985 B2 | 12/2020 | Nelson |
| 10,970,683 B2 | 4/2021 | Udezue |
| 10,992,906 B2 | 4/2021 | Bastide |
| 11,095,468 B1 | 8/2021 | Pandey |
| 11,159,767 B1 | 10/2021 | Kamisetty |
| 11,181,980 B2 | 11/2021 | DeLeeuw |
| 11,307,735 B2 | 4/2022 | Nelson |
| 11,341,439 B2 | 5/2022 | Meharwade |
| 11,470,022 B2 | 10/2022 | Nowak-Przygodzki |
| 11,514,914 B2 | 11/2022 | McQuiston |

(Continued)

FOREIGN PATENT DOCUMENTS

| | | |
|---|---|---|
| CN | 114144781 A | 3/2022 |

OTHER PUBLICATIONS

International Search Report and Written Opinion for International Application No. PCT/US2024/038245, mailed Nov. 20, 2024, 13 Pages.

*Primary Examiner* — Mahelet Shiberou
(74) *Attorney, Agent, or Firm* — Lowenstein Sandler LLP

(57)     ABSTRACT

A UI is provided for presentation on each client device participating in a virtual meeting. The UI includes visual items each corresponding to one or more participants. One of the visual items includes an avatar representing a virtual assistant that has a role of one of the participants. A communication of a first participant is provided via the UI during the virtual meeting. The communication indicates a request to perform an operation. A response of the virtual assistant to the indicated request is provided via the UI during the virtual meeting. The response of the virtual assistant is at least one of a textual response or an audio response.

31 Claims, 8 Drawing Sheets

(56) References Cited

U.S. PATENT DOCUMENTS

| | | | |
|---|---|---|---|
| 11,593,984 B2 | 2/2023 | Hussen Abdelaziz | |
| 11,647,060 B1 | 5/2023 | Mese | |
| 11,676,623 B1 | 6/2023 | Younes | |
| 2018/0131904 A1* | 5/2018 | Segal | G11B 27/031 |
| 2019/0057698 A1 | 2/2019 | Raanani et al. | |
| 2019/0189117 A1* | 6/2019 | Kumar | G06F 16/3329 |
| 2020/0092519 A1 | 3/2020 | Shin | |
| 2020/0145616 A1* | 5/2020 | Nassar | G06F 9/45533 |
| 2020/0258525 A1* | 8/2020 | Mcquiston | G06Q 10/109 |
| 2020/0403817 A1 | 12/2020 | Daredia | |
| 2021/0021558 A1* | 1/2021 | Mahmoud | H04L 51/046 |
| 2021/0375289 A1 | 12/2021 | Zhu | |
| 2021/0375291 A1 | 12/2021 | Zeng | |
| 2022/0174153 A1 | 6/2022 | Spohrer | |
| 2022/0391233 A1* | 12/2022 | Decrop | G06F 9/453 |
| 2023/0403174 A1* | 12/2023 | Mohanty | H04L 12/1831 |
| 2024/0430117 A1* | 12/2024 | Rivera-Rodriguez | |
| | | | G06V 10/25 |

* cited by examiner

100

400

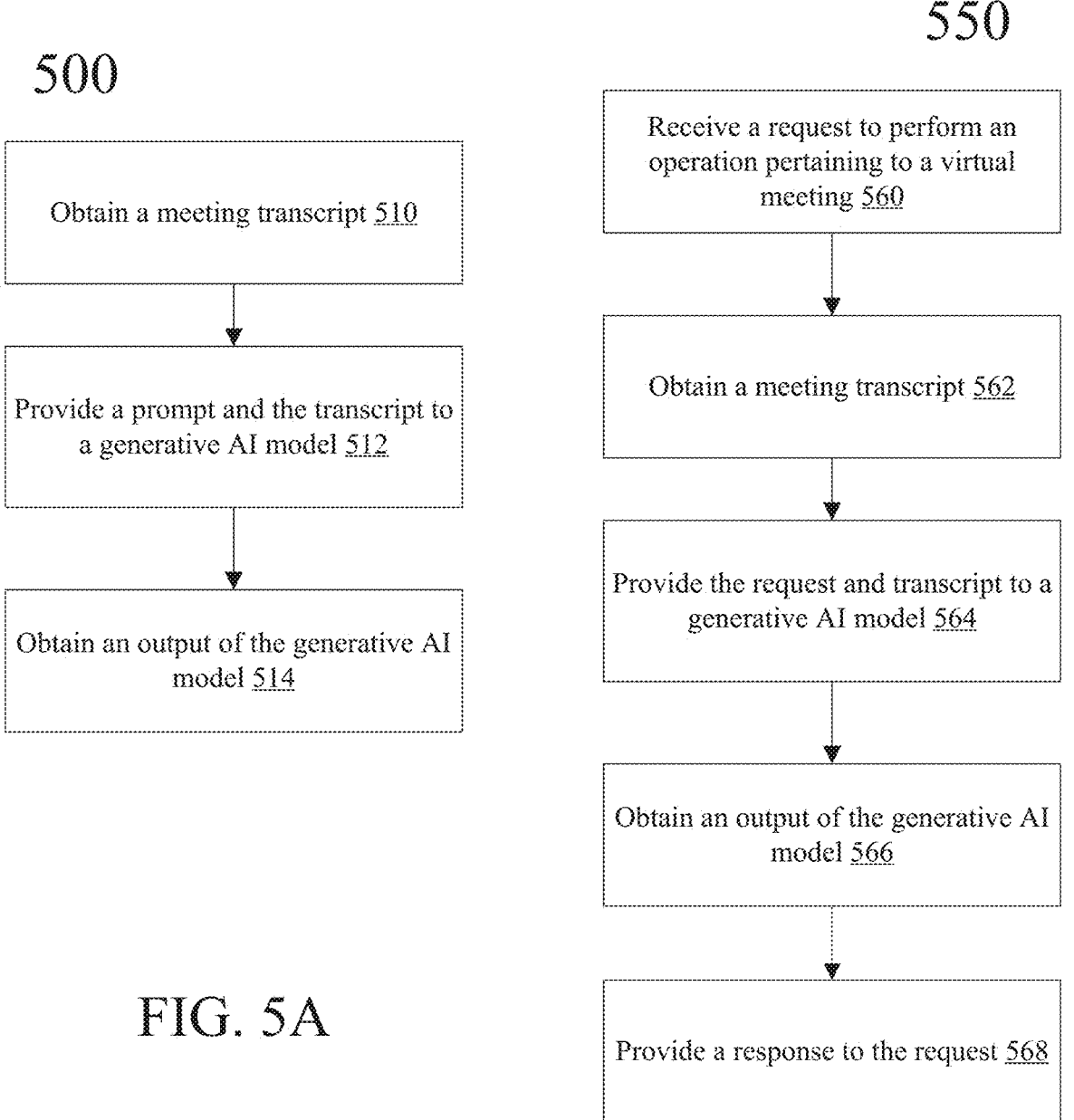

500

Obtain a meeting transcript 510

Provide a prompt and the transcript to a generative AI model 512

Obtain an output of the generative AI model 514

Receive a request to perform an operation pertaining to a virtual meeting 560

Obtain a meeting transcript 562

Provide the request and transcript to a generative AI model 564

Obtain an output of the generative AI model 566

Provide a response to the request 568

FIG. 5B

VIRTUAL AI ASSISTANT FOR VIRTUAL MEETINGS

TECHNICAL FIELD

Aspects and implementations of the present disclosure relate to providing a virtual artificial intelligence (AI) assistant for a virtual meeting.

BACKGROUND

Virtual meetings can take place between multiple participants via a platform (e.g., a virtual meeting platform) and can serve as virtual gathering where participants can share communications data with each other. In some instances, the shared communications data can be audio data (e.g., a voice of a user recorded via a microphone), video data (e.g., a video captured by a camera depicting a participant and/or a screen image of a client device) textual data (e.g., documents, hyperlinks, and/or written notes or impressions associated with a chat feature provided by the platform during the virtual meeting), and so forth. In some instances, participants of the meeting may communicate data that participants may want to save, access, and/or analyze at a later time (e.g., after the meeting has ended). For example, during a virtual meeting associated with a participant's employment, a participant may want to review the communications data of the virtual meeting for specific work deadlines, or access particular work documents that were shared during a portion of the virtual meeting. As participants of a virtual meeting can discuss a wide variety of topics and/or the virtual meeting can take a significant amount of time (e.g., an hour or more), it can be difficult for a participant to keep track of communications data that is important to the participant and save such communications data in a format that is useful to the participant for a later time.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

According to one aspect of the present disclosure, a method is provided. The method includes providing, for presentation on each of multiple client devices participating in a virtual meeting, a user interface (UI) during the virtual meeting. The UI includes multiple visual items each corresponding to one of multiple participants. One of the visual items includes an avatar representing a virtual assistant that has a role of one of the multiple participants. The method further includes, providing, via the UI during the virtual meeting, a communication of a first participant of the multiple participants, where the communication of the first participant indicates a request to perform an operation. The method further includes providing, via the UI during the virtual meeting, a response of the virtual assistant to the indicated request, where the response of the virtual assistant is at least one of a textual response or an audio response.

In some aspects, the indicated request includes a phrase spoken by the first participant or a text message entered by the first participant in the UI.

In some aspects, the phrase or the text message has one of one or more predefined prompt formats.

In some aspects, the phrase or the text message includes content associated with an inferred prompt.

In some aspects, the requested operation is at least one of preparation of meeting minutes, preparation of a meeting summary, generating tasks out of action items, booking a follow-up meeting, storing meeting notes for later reference, retrieving meeting notes of a previous virtual meeting, presenting a document, or generating a response to one or more questions.

In some aspects, the response of the virtual assistant is at least one of a response to the one or more questions, a follow-up question related to the one or more questions, or a confirmation that the one or more requested operations have been performed.

According to one aspect of the present disclosure, a method is provided. The method includes generating, during a virtual meeting, one or more media transcriptions of multiple media streams generated by one or more client devices associated with multiple participants of a virtual meeting. A media transcription of the one or more media transcriptions includes a communication of a participant of the multiple participants of the virtual meeting. The method further includes, based on the one or more media transcriptions and during the virtual meeting, that the communication of the participant of the multiple participants indicates a request to perform an operation. The method further includes providing, during the virtual meeting, the communication indicating the request to perform an operation as input to a generative AI model. The method further includes obtaining an output of the generative AI model. The method further includes providing a response to the indicated request during the virtual meeting using the output of the generative AI model.

In some aspects, the communication of the participant includes a phrase spoken by the participant or a text message entered by the participant.

In some aspects, the phrase or the text message has one of one or more predefined prompt formats.

In some aspects, the phrase or the text message includes content associated with an inferred prompt.

In some aspects, the requested operation is at least one of preparation of meeting minutes, preparation of a meeting summary, generating tasks out of action items, booking a follow-up meeting, storing meeting notes for later reference, retrieving meeting notes of a previous virtual meeting, presenting a document, or generating a response to one or more questions.

In some aspects providing the communication indicating the request of the participant as input to a generative AI model includes forming an input data by combining the communication indicating the request with a portion of the one or more media transcriptions. The portion of the one or more media transcriptions includes communications of the multiple participants of the virtual meeting up until a point in time that the communication indicating a request is received. The input data is provided as the input to the generative AI model. In some aspects, the response to the indicated request is at least one of a response to the one or more questions, a follow-up question related to the one or more questions, or a confirmation that the one or more requested operations have been performed.

In some aspects, the generative AI model has been trained on a corpora of text to create a foundation model.

In some aspects, the generative AI model has been fine-tuned on proprietary organizational data.

3

In some aspects, the generative AI model has been fine-tuned for application to a virtual meeting.

In some aspects, the method further includes associating each media transcription of the one or more media transcriptions with a metadata including a time-stamp indicative of when the communication associated with the media transcription was received, and a participant identifier identifying a participant of the multiple participants that provided the communication associated with the media transcription. The method further includes storing a meeting transcript including the one or more media transcriptions and the metadata to a memory device.

According to one aspect of the present disclosure, a method is provided. The method includes obtaining a meeting transcript including one or more media transcriptions of multiple media streams generated by one or more client devices associated with multiple participants of a virtual meeting. The method further includes providing, as input to a generative artificial intelligence (AI) model trained to perform multiple operations pertaining to a virtual meeting, at least a portion of the meeting transcript and a machine-generated prompt. The machine-generated prompt includes a request to perform at least one of the multiple operations pertaining to the virtual meeting. The method further includes obtaining an output of the generative AI model, the output including a result of the at least one performed operation.

In some aspects, the operation to be performed includes at least one of generating a summarization of the one or more media transcriptions, generating meeting minutes from the one or more media transcriptions, or suggesting future tasks based on the one or more media transcriptions.

In some aspects, the result of the performed operation includes at least one of a summarization of the one or more media transcriptions, meeting minutes from the one or more media transcriptions, or suggested future tasks based on the one or more media transcriptions.

In some aspects, the generative AI model has been pre-trained on a corpora of text to create a foundation model.

In some aspects, the generative AI model has been fine-tuned on proprietary organizational data.

In some aspects, the generative AI model has been fine-tuned for application to a virtual meeting.

According to one aspect of the present disclosure, a method is provided. The method includes receiving, from a client device of a user, a communication indicating a request to perform an operation relating to a virtual meeting. The method further includes obtaining a meeting transcript including multiple media transcriptions generated from multiple media streams provided by one or more client devices associated with multiple participants of the virtual meeting. The method further includes, providing the communication indicative of a request and at least a portion of the meeting transcript including multiple media transcriptions as input to a generative artificial intelligence (AI) model. The generative AI model is trained to perform multiple operations pertaining to the virtual meeting, at least one of the multiple operations corresponding to the request indicated by the communication. The method further includes, obtaining an output of the generative AI model. The method further includes, providing a response to the indicated request using the output of the generative AI model.

In some aspects obtaining a meeting transcript further includes identifying a meeting identifier within the communication indicating the request to perform the operation relating to a virtual meeting, and accessing the meeting transcript associated with the meeting identifier at a memory device.

In some aspects, identifying the meeting identifier within the communication indicating a request includes providing a response to a client device that provided the media stream corresponding to the communication indicating the request, the response including an additional request for further information associated with the virtual meeting.

In some aspects, the meeting identifier includes at least one of a date, a time, or a meeting subject.

In some aspects, the generative AI model has been pre-trained on a corpora of text to create a foundation model.

In some aspects, the generative AI model has been fine-tuned on proprietary organizational data.

In some aspects, the generative AI model has been fine-tuned for application to a virtual meeting.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 5A is a flow diagram of an example method for a virtual assistant to perform an operation with a generative AI model after the conclusion of a virtual meeting, in accordance with implementations of the present disclosure.

FIG. 5B is a flow diagram of an example method for users to interface with a generative AI model after the conclusion of a virtual meeting, in accordance with implementations of the present disclosure.

DETAILED DESCRIPTION

Figure 1:
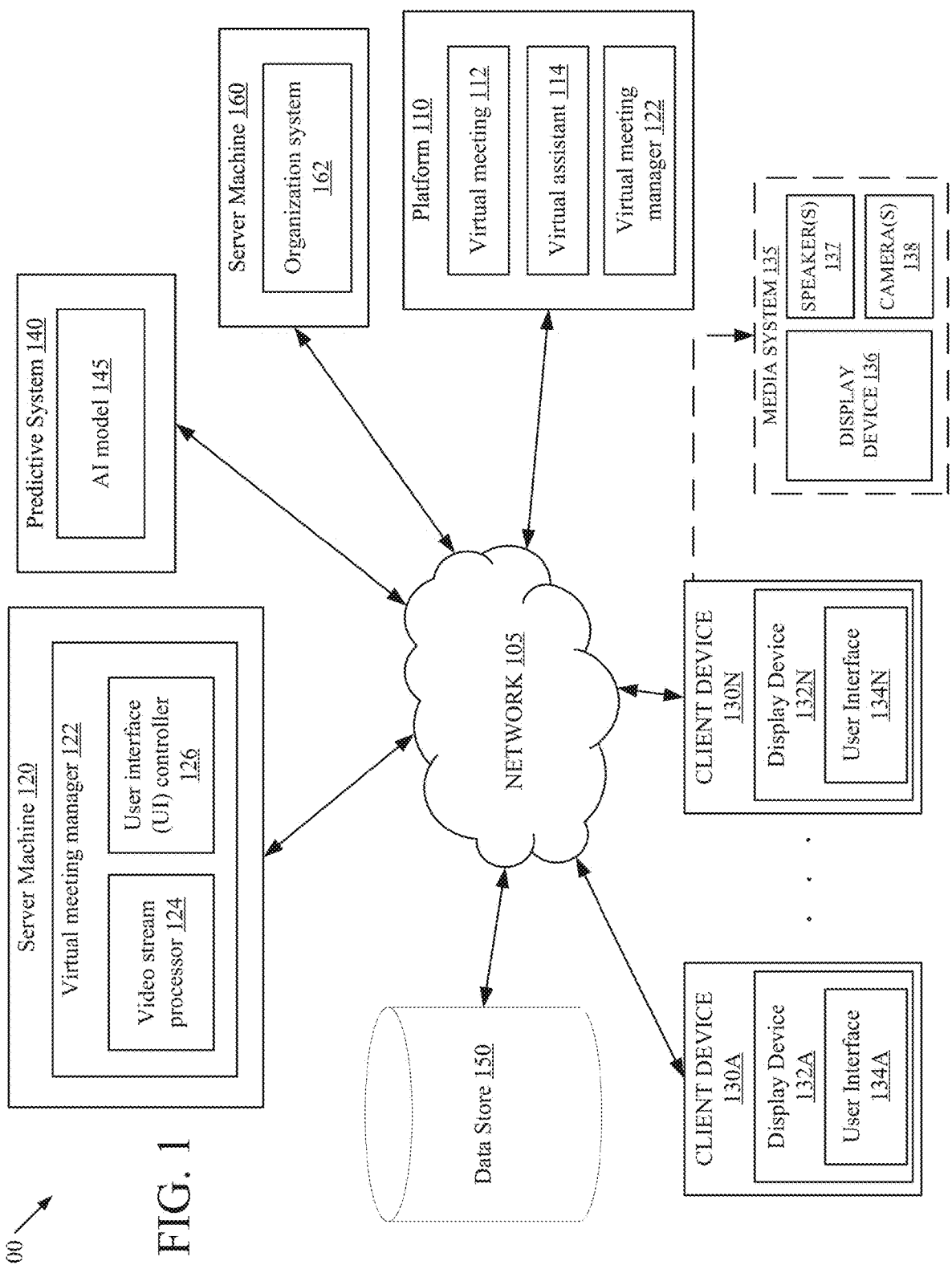
FIG. 1 illustrates an example system architecture capable of supporting a virtual meeting, in accordance with implementations of the present disclosure.

Aspects of the present disclosure relate to a virtual artificial intelligence (AI) assistant for a virtual meeting. A platform can enable users to connect with other users through a video or audio-based virtual meeting (e.g., a conference call, etc.). The platform can provide tools that allow client devices associated with users (referred to herein as participants) to share audio data and/or video data with client devices associated with other participants (e.g., over a network).

Some platforms (or client devices connected to platforms) can provide a virtual agent or a virtual assistant to users. Functionalities of a virtual agent or a virtual assistant (referred to simply as a virtual assistant herein) can be provided by a program that is configured to perform various tasks on behalf of a user. For example, a virtual assistant may be programmed to send electronic messages, make appointments, place phone calls, get directions, and so forth, on behalf of a user. Conventional implementations of virtual assistant programs face some challenges when communicating with humans in the setting of a virtual meeting. For instance, conventional virtual assistants often lack a visual representation of the assistant (e.g., the face or avatar of the virtual assistant), which can prevent a user from effectively engaging in the virtual meeting and with the virtual assistant. For example, a virtual assistant of a conventional virtual meeting platform can provide textual communication data to a user (e.g., via a chat box of a user interface (UI) of the virtual meeting).

Participants of the meeting may be distracted by the textual communication data and therefore may not be fully engaged in the meeting discussion. As a result, discussion topics may be covered again (sometimes multiple times) during the meeting, which can increase the overall duration of the virtual meeting. Computing resources (e.g., processing cycles, memory space, etc.) are consumed by the platform and/or client devices connected to the platform to facilitate the increased duration of the virtual meeting. Such resources are unavailable to other processes (e.g., of the platform, of the client devices, etc.), which can increase an overall latency and decrease an overall efficiency of the system.

A further obstacle for current implementations of virtual assistant in a virtual meeting includes how the virtual assistant is engaged by and/or communicates with participants. In many instances, a virtual assistant is unable to perform an operation requested by a participant unless the request is provided according to a pre-established format. For example, a virtual assistant may not initiate performing a requested operation unless input language specifically directed to the virtual assistant, often indicated by specified keyword or phrase, is detected. Participants that wish to engage the virtual assistant during a virtual meeting are to pause the virtual meeting discussion to provide the specified keyword or phrase. Pausing the discussion to engage the virtual assistant can further increase the duration of the virtual meeting, which can cause a larger amount of computing resources to be unavailable to other processes, as described above. Further, conventional virtual assistants may be configured or otherwise programmed to provide pre-determined responses to a limited set of request types, and such responses may only be in text form, or consist of language that is overly structured and mechanistic. Such virtual assistants may not provide a participant with the information that is requested and/or may provide different information than what is requested by the user. The above-described challenges and obstacles associated with conventional virtual assistants can render such virtual assistants ineffective and often overlooked as a resource for accomplishing important tasks pertaining to a virtual meeting.

Aspects and implementations of the present disclosure address these and other deficiencies by providing a virtual AI assistant for virtual meetings. A platform (e.g., a virtual meeting platform) can provide participants of a virtual meeting with access to a virtual AI assistant (referred to herein simply as AI assistant) before, during, and/or after the virtual meeting. In some embodiments, the platform (or client devices connected to the platform) can present a virtual avatar of the virtual assistant as a participant of the virtual meeting (e.g., as a virtual participant) alongside other participants of the meeting. For example, the platform can render a digital representation of the virtual assistant and can provide, via a virtual meeting UI, the rendering of the virtual avatar for presentation as a virtual participant alongside video streams of the other participants of the virtual meeting. The other participants of the virtual meeting (e.g., the non-virtual participants) can engage with the virtual assistant as they would engage another non-virtual participant. For example, the other participants can engage one or more UI elements of the virtual meeting UI (e.g., a mute/unmute button) to initiate a discussion with the virtual assistant. When the virtual assistant is ready to provide a response to the participant(s), the platform can update the rendering of the virtual assistant in accordance with the provided response, so to depict the virtual participant responding to the non-virtual participants according to the flow of the virtual meeting discussion. Further details regarding the rendering of the virtual assistant as a virtual participant are provided herein.

Functionalities of the virtual assistant can be supported by an AI model (e.g., a generative AI model) that is trained to perform multiple types of tasks pertaining to the virtual meeting. The tasks can include, but are not limited to, preparation of meeting minutes associated with the virtual meeting, preparation of a meeting summary of a discussion of the virtual meeting, scheduling a follow-up meeting after completion of the virtual meeting, storing meeting notes (e.g., meeting minutes, a meeting summary, etc.) at a memory for future reference by the one or more participants, retrieving meeting notes (e.g., meeting minutes, a meeting summary, etc.) from a prior virtual meeting, presenting an electronic document to participants of the virtual meeting, providing a response to questions provided by one or more participants of the virtual meeting, and so forth.

In some embodiments, the virtual assistant may engage with participants of the meeting (e.g., via the virtual avatar) to perform one or more tasks pertaining to the virtual meeting. For instance, the platform may obtain communication data indicating communications between the participants of the virtual meeting. The communication data can include audio data (e.g., including an audio signal of one or more phrases provided by a participant), video data (e.g., depicting one or more participants, an environment of the one or more participants, and/or a screen image of a client device associated with the one or more participants), textual data (e.g., text provided via a chat box of the virtual meeting UI), impression data (e.g., a "like" or emoji provided by a participant via the virtual meeting UI), and other such digital inputs. In some instances, the communication data can be included in a transcript file that is generated and/or updated (e.g., in real time or approximately real time) during or after the virtual meeting. Such communication data can reflect natural language communication between participants of the virtual meeting.

The platform can feed the communication data as input to the AI model, which can be configured or otherwise trained to identify a request by one or more participants of the virtual meeting and perform one or more tasks in response to the request. In some embodiments, the AI model can be trained on a large corpus of data so to predict a context of a statement included in input communication data and/or perform the tasks in response to a detected statement. In additional or alternative embodiments, the AI model may be fine-tuned to function within a specific organization and/or within a specific type of virtual meeting. The platform can obtain one or more outputs of AI model, the one or more outputs including or otherwise corresponding to the task performed by the AI model in response to a request. The platform can provide participants of the virtual meeting with information pertaining to the task performed by the virtual assistant and/or the AI model during or after completion of the virtual meeting. In some instances, the platform can update the virtual meeting UI (e.g., during the virtual meeting) to display information corresponding to the performed task. For example, the AI model can detect, based on given communication data, that a participant has requested meeting minutes for a prior virtual meeting, which are stored in a file at a data store accessible to the platform. The AI model can access the file including the requested meeting minutes and provide the file (or content of the file) to the platform. The platform can update the virtual meeting UI of one or more participants to include the content of the provided file, in accordance with the request. According to embodiments of the present disclosure, the virtual assistant and/or the AI model can respond to multiple types of request by participant(s) (e.g., without detection of a specified or pre-defined keyword or phrase by the participant(s)).

As indicated above, aspects of the present disclosure cover techniques that enable a platform to provide participants of a virtual meeting with a virtual assistant that can handle a wide range of requests without breaking the flow of a discussion during the virtual meeting. By presenting the virtual assistant as a participant of the virtual meeting (e.g., alongside non-virtual participants), the non-virtual participants can engage with the virtual assistant in a way that is not distracting to the participants and/or does not disrupt the discussion during the virtual meeting. For instance, when a participant wishes to engage with the virtual assistant, the participant can select one or more UI elements (e.g., a mute/unmute button) to engage with the virtual assistant as they would for any other virtual participant. In other or similar embodiments, the virtual assistant can respond to requests by non-virtual participants of the virtual meeting without any initial interaction by the non-virtual participants and, in some instances, provide non-virtual participants with information pertaining to the requests after completion of the virtual meeting. As such, participants can be fully engaged in the virtual meeting discussion without distraction by the virtual assistant, which can reduce the overall duration of the virtual meeting. As the duration of the virtual meeting is reduced, the amount of computing resources consumed by the platform and/or the client devices connected to the platform is also reduced. Such resources are therefore available to other processes (e.g., at the platform and/or the client devices), which can decrease an overall latency and increase an overall efficiency of the system.

FIG. 1 illustrates an example system architecture 100 capable of supporting a virtual meeting, in accordance with implementations of the present disclosure. The system architecture 100 (also referred to as "system" herein) includes a platform 110, client devices 130A-N, a data store 150, one or more server machines (e.g., server machine 120, server machine 160, etc.), and/or a predictive system 140, each connected to a network 105. Platform 110 and/or server machines 120, 160, etc. can include or can be otherwise connected to one or more computing devices, (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a virtual meeting 112.

In implementations, network 105 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 150 is a persistent storage that is capable of storing data as well as data structures to tag, organize, and index the data. A data item may include audio data and/or video stream data, in accordance with embodiments described herein. Data store 150 may be hosted by one or more storage devices, such as main memory, magnetic or optical storage-based disks, tapes or hard drives, network-attached storage (NAS), storage area network (SAN), and so forth. In some implementations, data store 150 may be a network-attached file server, while in other embodiments, data store 150 may be some other type of persistent storage such as an object-oriented database, a relational database, and so forth, that may be hosted by virtual meeting platform 110 or one or more different machines (e.g., the communication server machine 120) coupled to the virtual meeting platform via network 105.

Platform 110 may enable users of client devices 130A-N to connect with each other via a virtual meeting 112. A virtual meeting 112 can be a video-based virtual meeting, which includes a meeting during which a client device 130 connected to platform 110 captures and transmits image data (e.g., collected by a camera of a client device 130) and/or audio data (e.g., collected by a microphone of the client device 130) to other client devices 130 connected to platform 110. The image data can, in some embodiments, depict a user or group of users that are participating in the virtual meeting 112. The audio data can include, in some embodiments, an audio recording of audio provided by the user or group of users during the virtual meeting 112. In additional or alternative embodiments, the virtual meeting 112 can be an audio-based virtual meeting, which includes a meeting during which a client device 130 captures and transmits audio data (e.g., without generating and/or transmitting image data) to other client devices 130 connected to platform 110. In some instances, a virtual meeting can include or otherwise be referred to as a conference call. In such instances, a video-based virtual meeting can include or otherwise be referred to as a video-based conference call and an audio-based virtual meeting can include or otherwise be referred to as an audio-based conference call.

The client devices 130A-N can each include computing devices such as personal computers (PCs), laptops, mobile phones, smart phones, tablet computers, netbook computers, notebook computers, network-connected televisions, etc. In some implementations, client devices 130A-N may also be referred to as "user devices." A client device 130 can include an audiovisual component that can generate audio and video data to be streamed to the virtual meeting platform 110. In some implementations, the audiovisual component can include one or more devices (e.g., a microphone, etc.) that capture an audio signal representing audio provided by the user. The audiovisual component can generate audio data (e.g., an audio file or audio stream) based on the captured audio signal. In some embodiments, the audiovisual component can additionally or alternatively include one or more devices (e.g., a speaker) that output data to a user associated with a particular client device 130. In some embodiments, the audiovisual component can additionally or alternatively include an image capture device (e.g., a camera) to capture images and generate image data (e.g., a video stream) of the captured images.

Figure 2A:
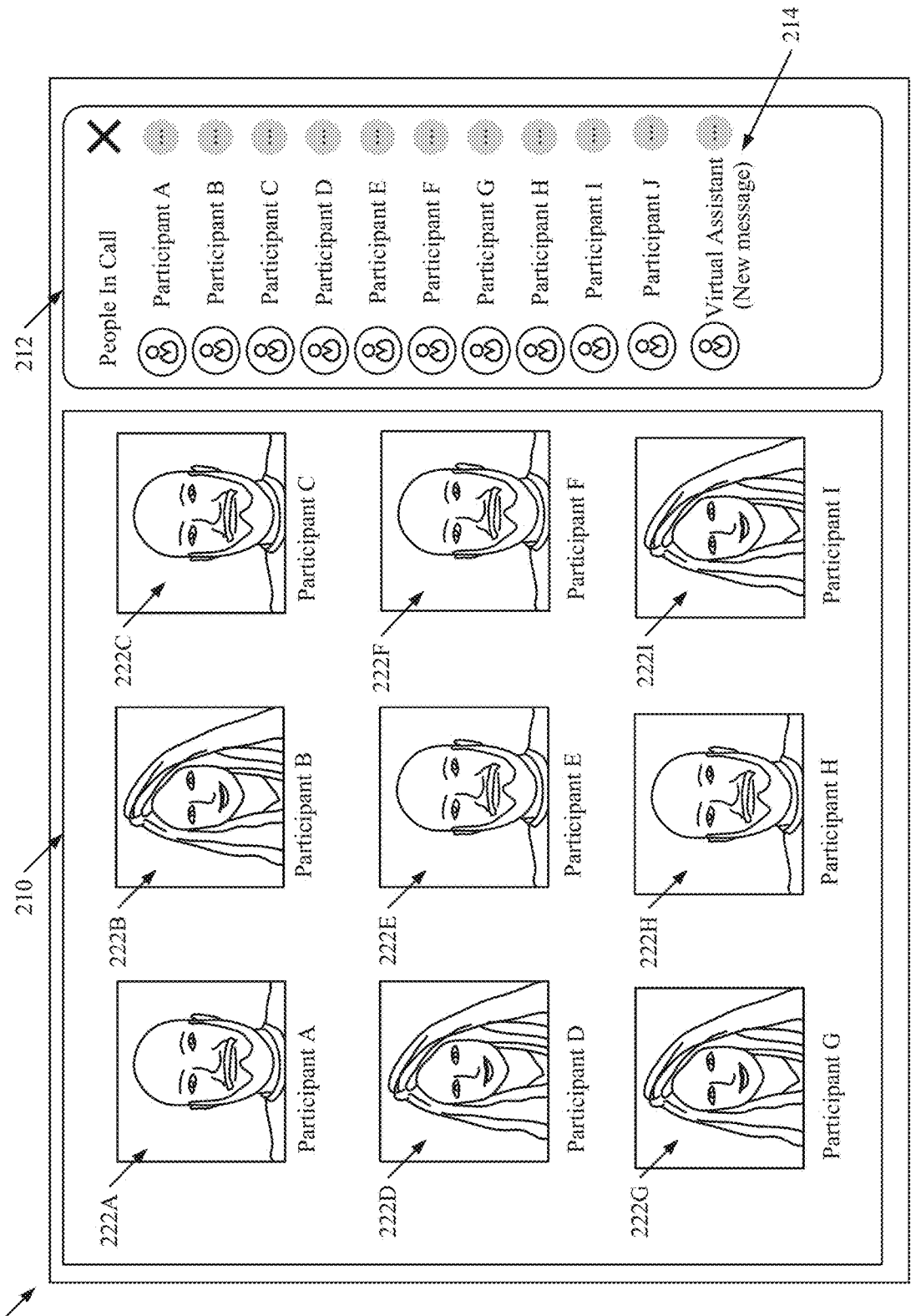
FIG. 2A illustrates an example user interface (UI) of a virtual meeting, in accordance with implementations of the present disclosure.
Figure 2B:
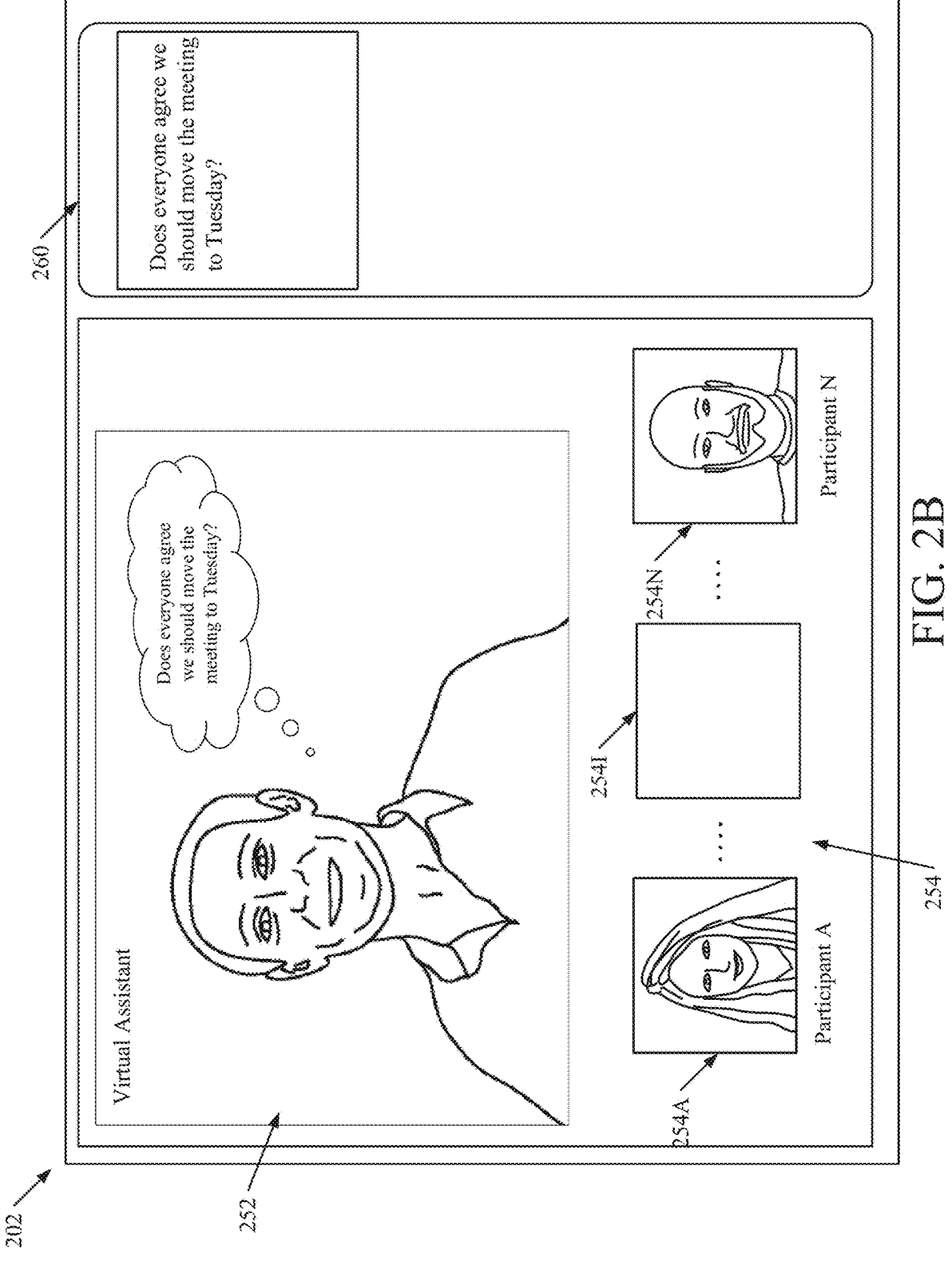
FIG. 2B illustrates an example user interface (UI) with a virtual avatar for a virtual assistant in accordance with implementations of the present disclosure.

Client devices 130A-N can each include a content viewer, in some embodiments. In some implementations, a content viewer can be an application that provides a user interface (UI) (sometimes referred to as a graphical user interface (GUI)) for users to access a virtual meeting 112 hosted by platform 110. Such UI is also referred to as virtual meeting UI 134 herein. The content viewer can be included in a web browser and/or a client application (e.g., a mobile application, a desktop application, etc.). In one or more examples, a user of client device 130A can join and participate in a virtual meeting 112 via UI 134A presented via display device 132A via the web browser and/or client application. A user can also present or otherwise share a document to other participants of the virtual meeting 112 via each of UIs 134A-N. In some embodiments, platform 110 can enable real-time (or approximately real-time) editing of a document shared via UI 132, allowing participants to collaborate on shared documents during a virtual meeting 112. Each of UIs 134A-N can include multiple regions that enable presentation of visual items corresponding to video streams of client devices 130A-N provided to platform 110 during the virtual meeting 112. In some embodiments, the UI 134 can include one or more UI elements that support a chat feature, or only text-based communication feature. This chat feature allows for side conversations, clarification of points, emojis, user-impressions, and other, non-verbal participant communications during the meeting. FIGS. 2A-2B illustrate example video conference UIs, in accordance with embodiments of the present disclosure.

In some embodiments, one or more client devices 130 can be devices of a physical conference room or a meeting room. Such client devices 130 can be included at or otherwise coupled to a media system 135 that includes one or more display devices 136, one or more speakers 137 and/or one or more cameras 138. A display device 136 can be or otherwise include a smart display or a non-smart display (e.g., a display that is not itself configured to connect to platform 110 or other components of system 100 via network 105). Users that are physically present in the conference room or the meeting room can use media system 135 rather than their own client devices 130 to participate in a virtual meeting, which may include other remote participants. For example, participants in the conference room or meeting room that participate in the virtual meeting may control display device 136 to share a slide presentation with, or watch a slide presentation of, other participants that are accessing the virtual meeting remotely. Sound and/or camera control can similarly be performed. As described above, a client device 130 connected to a media system 135 can generate audio and video data to be streamed to platform 110 (e.g., using one or more microphones (not shown), speaker(s) 137 and/or camera(s) 138).

As described above, platform 110 can facilitate a virtual meeting 112 between multiple participants. Platform 110 can facilitate a virtual meeting 112 between any number of client devices 130 associated with any number of participants. In some embodiments, platform 110 can support textual conferencing capabilities, audio conferencing capabilities, video conferencing capabilities, or any combination thereof. Participants may engage in real-time discussions, ask questions, provide feedback, through use of a client device coupled with a microphone and camera. The platform 110 can synchronize and deliver digital communications, such as text, impressions, emoji, audio, video, and other kinds of communications data to client devices 130 with minimal latency. In some embodiments, real-time communication refers to the ability for participants to communicate (e.g., exchange information) instantly (or relatively instantly) without transmission delays and/or with negligible (e.g., milliseconds or microseconds) latency.

In some embodiments platform 110 interfaces with a communication server (e.g., at or coupled to server machine 120), which may act as a bridge, facilitating the low-latency exchange of communications data between client devices 130 during the virtual meeting. Communications feeds (e.g., audio feeds, video feeds, etc.) collected by client devices 130 are transmitted to the communications server machine 120, which then distributes the data to the appropriate recipient client devices 130 in real-time (or approximately real time). In some embodiments, platform 110 can implement the rules and/or protocols for facilitating virtual meeting 112, and communications server machine 120 can provide supporting structures, such as virtual meeting UI 134 and/or communications management (more details provided below), for hosting virtual meeting 112 via client devices 130A-N.

In some embodiments, platform 110 can include a virtual meeting manager 122. Virtual meeting manager 122 can be configured to manage a virtual meeting 112 between two or more users of platform 110. In some embodiments, virtual meeting manager 122 can reside at server machine 120 (e.g., communications server machine 120), as illustrated in FIG. 1. In some embodiments, virtual meeting manager 122 can provide UI 134 to each of client devices 130 to enable users to watch and listen to each other during a video conference. Virtual meeting manager 122 can also collect and provide data associated with the virtual meeting 112 to each participant of the virtual meeting 112.

As will be discussed in further detail below, in some embodiments, the virtual meeting manager 122 may determine visual items for presentation on UIs 134A-N during a virtual meeting 112. As will further be discussed with respect to FIG. 2A, a visual item may refer to a UI element that occupies a particular region in the UI. In some instances, a visual item can be dedicated to presenting a video stream from a respective client device 130 to other client devices 130.

As illustrated in FIG. 1, virtual meeting manager 122 can include a video stream processor 124 and/or a UI controller 126. It should be noted that although video stream processor 124 and UI controller 126 are depicted as separate components, functionalities of video stream processor 124 and UI controller 126 can be performed by the same component. It should also be noted that functionalities of video stream processor 124 and UI controller 126 can be performed at separate server machines, in some embodiments.

The video stream processor 124 may receive video streams from client devices 130A-N. The video stream processor 124 may determine video streams for presentation in the UIs 134A-N during the virtual meeting 112 via UI controller 126. Each video stream may correspond to a video stream from a respective client device 130 (e.g., the video stream pertaining to one or more participants of the virtual meeting). In some implementations, the video stream processor 124 may receive audio streams associated with the video streams from the client devices 130 (e.g., from an audiovisual component of the client devices).

In some embodiments, the video stream processor 124 may determine video streams to be provided for presentation in the UIs 134A-N during the virtual meeting. For example, one or more participants of the virtual meeting may be identified and included in the subset of participants for presentation of their respective video streams in the UI 134A of client device 130A associated with a first user. In some embodiments, the video stream processor 124 may modify a position or a size of one or more video streams, such to cause one or more of the video streams to be rearranged in the UI 134. Once the video stream processor has determined video streams for presentation in the UI 134, the video stream processor 124 can provide a notification to UI controller 126 (e.g., via network 105, via a bus) of the determined video streams.

The UI controller 126 may provide UI 134 to client devices 130 during virtual meeting 112. As will be explained in further detail with respect to FIGS. 2A-2B, the UI 134 may include multiple regions. One or more regions may display a video stream depicting or otherwise pertaining to one or more participants of the virtual meeting 112. The UI controller 126 may control which video stream is to be displayed by providing a command to the client devices 130 that indicates which video stream is to be displayed in which region of the UI (along with the received video and audio streams being provided to the client devices).

In some embodiments, meeting platform 110 may provide a virtual assistant 114 to participate in the virtual meeting 112. In some embodiments, virtual assistant 114 may be one or more computer software programs (e.g., executed by platform 110 and/or one or more of server machines 120, 160, etc.) to perform various tasks on behalf of a user. As will further be discussed with respect to FIGS. 2A and 2B, virtual assistant 114 can have a capability to engage in the virtual meeting 112 and with participants of the meeting. In some embodiments, the virtual assistant 114 can enhance a meeting experience and productivity for participants by assisting participants both during and after the virtual meeting by providing intelligent and automated support. During a virtual meeting, the virtual assistant may actively monitor and analyze meeting communications.

In some embodiments, platform 110 can provide a rendering of a virtual avatar representing virtual assistant 114 for presentation as a virtual participant of virtual meeting 112. In some embodiments the virtual assistant 114 may provide a real-time participant virtual avatar, so as to seamlessly integrate with the virtual meeting 112 with the other participants of the meeting.

In some embodiments, which will be discussed in further detail below, the virtual assistant 114 may interface with organizational systems 162 (e.g., residing at server machine 160) of an organization associated with the meeting 112, so as to provide further capability and functionality to the participants of the meeting. Examples of organizational systems 162 include software content collaboration systems or software development tracking tools. The virtual assistant 114 can, for instance, send action items discussed during the meeting to the organizational system(s) 162 or publish the meeting data and transcripts, either partially or in entirety. Further details of the organization system(s) 162 will be found below.

In some embodiments, the virtual assistant 114 may interact with a user after the conclusion of a virtual meeting 112. An interface (e.g., other than or in addition to UI 134) may be provided that allows a user to specify to the virtual assistant a request associated with data from a specific virtual meeting. The virtual assistant can then perform tasks to provide a response to a user request.

In some embodiments, the virtual assistant computer program is not limited to being executed by a hardware associated with the meeting platform 110. In some embodiments, the virtual assistant computer program may be executed by any of the processors associated with the network and the virtual meeting, including communications server machine 120, organization systems server machine 160, predictive system 180 or even any one of client devices 130A-N. In some embodiments, the virtual assistant computer program may be executed by multiple processors, at multiple locations across any combination of one or more servers.

In some embodiments, which will be discussed in further detail below, functionalities of virtual assistant 114 can be supported by an AI model 145 (e.g., residing at predictive system 140), as described herein. AI model 145 can be trained to perform multiple types of tasks pertaining to the virtual meeting 112. The tasks can include, but are not limited to, preparation of meeting minutes associated with the virtual meeting, preparation of a meeting summary of a discussion of the virtual meeting, scheduling a follow-up meeting after completion of the virtual meeting, storing meeting notes (e.g., meeting minutes, a meeting summary, etc.) at a memory for future reference by the one or more participants, retrieving meeting notes (e.g., meeting minutes, a meeting summary, etc.) from a prior virtual meeting, presenting an electronic document to participants of the virtual meeting, providing a response to questions provided by one or more participants of the virtual meeting, and so forth. AI model 145 may be (or may correspond to) one or more computer programs executed by processor(s) of predictive system 140. In other embodiments, AI model 145 may be (or may correspond to) one or more computer programs executed across a number or combination of server machines (e.g., server machine 120, server machine 160, etc.).

In some embodiments, the virtual assistant 114 may interface with one or more AI models, including generative AI model 145 (described in further detail below). Virtual assistant 114 may send textual data to AI model 145 over network 105, and may receive textual responses from AI model 145. In this way, the virtual assistant 114 may provide responses to questions and communications from participants of the meeting created by the AI model 145.

In some embodiments, the AI model 145 can be an AI model that has been trained on a corpus of textual data. In some embodiments, the AI model 145 can be a model that is first pre-trained on a corpus of text to create a foundational model, and afterwards fine-tuned on more data pertaining to a particular set of tasks to create a more task-specific, or targeted, model. The foundational model can first be pre-trained using a corpus of text that can include text context in the public domain, licensed content, and/or proprietary content. Such a pre-training can be used by the model to learn broad language elements including general sentence structure, common phrases, vocabulary, natural language structure, and any other elements commonly associated with natural language in a large corpus of text. In some embodiments, this first, foundational model can be trained using self-supervision, or unsupervised training on such datasets.

In some embodiments, the AI model 145 can then be further trained and/or fine-tuned on organizational data, including proprietary organizational data. The AI model 145 can also be further trained and/or fine-tuned on organizational data associated with a virtual meeting 112, including proprietary organizational data associated with a virtual meeting 112.

In some embodiments, the second portion of training, including fine-tuning, may be unsupervised, supervised, reinforced, or any other type of training. In some embodiments, this second portion of training may include some elements of supervision, including learning techniques incorporating human or machine-generated feedback, undergoing training according to a set of guidelines, or training on a previously labeled set of data, etc. In a non-limiting example associated with reinforcement learning, the outputs of the AI model 145 while training may be ranked by a user, according to a variety of factors, including accuracy, helpfulness, veracity, acceptability, or any other metric useful in the fine-tuning portion of training. In this manner, the AI model 145 can learn to favor these and any other factors relevant to users within an organization, or associated with a virtual meeting, when generating a response. In such a way, a foundational model can be further trained to perform within a virtual meeting, and provide useful information, as well as help to accomplish useful tasks associated with the virtual meeting.

In some embodiments, the AI model 145 may include one or more pre-trained models, or fine-tuned models. In a non-limiting example, in some embodiments, the goal of the "fine-tuning" may be accomplished with a second, or third, or any number of additional models. For example, the outputs of the pre-trained model may be input into a second AI model that has been trained in a similar manner as the "fine-tuned" portion of training above. In such a way, two more AI models may accomplish work similar to one model that has been pre-trained, and then fine-tuned.

In one embodiment, the AI model 145 may be one or more of decision trees, random forests, support vector machines, or other types of machine learning models. In one embodiment, the AI model 145 may be one or more artificial neural networks (also referred to simply as a neural network). The artificial neural network may be, for example, a convolutional neural network (CNN) or a deep neural network. In one embodiment, processing logic performs supervised machine learning to train the neural network.

Artificial neural networks generally include a feature representation component with a classifier or regression layers that map features to a target output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). The neural network may be a deep network with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. Neural networks may learn in a supervised (e.g., classification) and/or unsupervised (e.g., pattern analysis) manner. Some neural networks (e.g., such as deep neural networks) include a hierarchy of layers, where the different layers learn different levels of representations that correspond to different levels of abstraction. In deep learning, each level learns to transform its input data into a slightly more abstract and composite representation.

In some embodiments, the AI model 145 may be one or more recurrent neural networks (RNNs). An RNN is a type of neural network that includes a memory to enable the neural network to capture temporal dependencies. An RNN is able to learn input-output mappings that depend on both a current input and past inputs. The RNN will address past and future measurements and make predictions based on this continuous measurement information. One type of RNN that may be used is a long short term memory (LSTM) neural network.

As indicated above, the AI model 145 may be one or more generative AI models, allowing for the generation of new and original content. The generative AI model can use other machine learning models including an encoder-decoder architecture including one or more self-attention mechanisms, and one or more feed-forward mechanisms. In some embodiments, the generative AI model can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model can also utilize the previously discussed deep learning techniques, including recurrent neural networks (RNNs), convolutional neural networks (CNNs), or transformer networks. Further details regarding generative AI models are provided herein.

In some implementations, the data store 150 may store portions of audio and video streams received from the client devices 130A-N for the virtual meeting platform 110. Moreover, the data store 150 may store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 130A-N and/or concurrently editable by the users. In some implementations, the data store 150 may store audio or textual transcripts for user communications for the virtual meeting platform 110. Each segment of audio or textual data may be associated with a respective user of the virtual meeting platform 110 and may include a time stamp indicative of the temporal placement of the data with respect to a virtual meeting. In some embodiments, all communications whether they be text, audio, transcripts, shared documents or files, or actions performed on a client device, originating from participants of a virtual meeting enabled by the virtual meeting platform 110 may be stored in data store 150.

In some embodiments, all communications whether they be emojis, impressions, text, audio, transcripts, shared documents or files, or actions performed on a client device, originating from participants of a virtual meeting enabled by the virtual meeting platform 110 may be stored by the virtual assistant on the same server as the virtual assistant. In some embodiments, at the conclusion of the meeting, the virtual assistant may move the collected communications onto data store 150.

In some embodiments, any one of the associated servers, including the communications server machine 120 and the virtual meeting platform 110, may temporarily accumulate and store data until it is transferred to data store 150 for permanent storage.

In some embodiments, system 100 may include an organization system server machine 160 that is connected to network 105 and interfaces with the other components of the system 100, including the virtual AI assistant. In some embodiments, server machine 160 may include an organization system 162. Examples of organizational systems 162 include software content collaboration systems, software development tracking tools, productivity tools, task management systems, emailing systems, data filing systems, document filing systems, scheduling or calendar systems, or any such similar systems used by an organization.

In some embodiments, the virtual assistant can, for instance, send action items discussed during the meeting to the organizational system(s) 162 or publish the meeting data and transcripts, either partially or in entirety to participants of the meeting or other non-participants of the meeting that are associated with the organizational systems. The virtual assistant can access organizational system(s) 162 for specific organizational information or perform tasks related to these subsystems, such as retrieving documents, tracking project progress, or managing task assignments.

It is appreciated that in some other implementations, the functions of platform 110, server machine(s) 120 and/or 160 may be provided by a fewer number of machines. For example, in some implementations, functionalities of platform 110, server machine(s) 120 and/or 160, and/or predictive system 180 may be integrated into a single machine, while in other implementations, functionalities of platform 110, server machine(s) 120 and/or 160, and/or predictive system 180 may be integrated into multiple machines. In addition, in some implementations, server machine(s) 120 and/or 160 and/or predictive system 180 may be integrated into platform 110.

In general, functions described in implementations as being performed by virtual meeting platform 110, server machine(s) 120 and/or 160, and/or predictive system 180 may also be performed by the client devices 130A-N. In addition, the functionality attributed to a particular component may be performed by different or multiple components operating together. Platform 110, server machine(s) 120 and/or 160, and/or predictive system 180 may also be accessed as a service provided to other systems or devices through appropriate application programming interfaces, and thus is not limited to use in websites.

Although implementations of the disclosure are discussed in terms of platform 110 and users of platform 110 participating in a virtual meeting, implementations may also be generally applied to any type of telephone call or conference call between users. Implementations of the disclosure are not limited to virtual meeting platforms that provide virtual meeting tools to users.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the virtual meeting platform 110.

In situations in which the systems discussed here collects personal information about users, or may make use of personal information, the users may be provided with an opportunity to control whether virtual meeting platform 110 collects user information (e.g., information about a user's social network, social actions or activities, profession, a user's preferences, or a user's current location), or to control whether and/or how to receive content from the communication server machine 120 that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the platform 110, predictive system 180 and/or server machine(s) 120 and/or 160.

FIG. 2A illustrates an example user interface (UI) 200 for a virtual meeting, in accordance with some embodiments of the present disclosure. The UI 200 may be provided by one or more processing devices of a communications server, such as communication server machine 120 of FIG. 1. In some embodiments, the UI 200 may be provided by a virtual meeting manager, such as virtual meeting manager 122 of FIG. 1, for presentation at a client device (e.g., client devices 130A-N of FIG. 1). In some implementations, the virtual meeting between multiple participants may be managed by a virtual meeting platform, such as virtual meeting platform 110 of FIG. 1. As described with respect to FIG. 1, virtual meeting manager 122 may provide the UI 200 to enable participants (e.g., participants A-J seen in FIG. 2A) to join and participate in the virtual meeting. UI 200 can correspond to a UI 134, described with respect to FIG. 1.

As illustrated in FIG. 2A, UI 200 can include one or more visual items. As was discussed with respect to FIG. 1, a visual item may refer to a UI element that occupies a particular region in the UI. In some instances, and by way of a non-limiting example, a visual item can be dedicated to presenting a video stream from a respective client device (e.g., a client device from client devices 130A-N in FIG. 1) to other client devices (e.g., a different client device from client devices 130A-N in FIG. 1). Such a video stream may depict, for example, a user of the respective client device while the user is participating in the virtual meeting (e.g., speaking, presenting, listening to other participants, watching other participants, etc., at particular moments during the virtual meeting), a physical conference or meeting room (e.g., with one or more participants present), a document or media content (e.g., video content, one or more images, etc.) being presented during the virtual meeting, and the like.

In some embodiments, and dependent on the type and purpose of the virtual meeting, multiple visual items and respective regions in the UI may be incorporated. As illustrated in FIG. 2A, UI 200 can include region 210 and region 212. In some embodiments, UI 200 may include multiple regions that can include different visual items and aspects associated with a virtual meeting. UI 200 may include a main region 210 to display one or more video streams and/or visual items corresponding to video and data captured and/or streamed by client devices. In an example, region 210 of UI 200 can correspond to a main visual item and region 212 can correspond to a smaller region (e.g., a scrollable region). Although FIG. 2A depicts UI 200 as having two regions, one of ordinary skill in the art, having the benefit of this disclosure, will understand that more (or fewer) visual items and/or associated regions can be included in UI 200 for presentation to a user, as can be reasonable to be perceived and understood by the human eye.

In some embodiments, the main region 210 may include multiple sub-regions, which can include visual items that each display a video stream corresponding to the video data captured and/or streamed by client devices associated with participants of the virtual meeting. In an illustrative example, the main region 210 may include sub-regions 222A-I. It should be noted that although FIG. 2A depicts nine sub-regions, any number of sub-regions can be included in main region 210.

As illustrated, the sub-region 222A may display a video stream corresponding to video data captured and/or streamed by a client device associated with Participant A. The sub-region 222B may display a video stream corresponding to video data captured and/or streamed by a client device associated with Participant B. The sub-region 222C may display a video stream corresponding to video data captured and/or streamed by a client device associated with Participant C. The sub-region 222D may display a video stream corresponding to video data captured and/or streamed by a client device associated with Participant D. The sub-region 222E may display a video stream corresponding to video data captured and/or streamed by a client device associated with Participant E. The sub-region 222F may display a video stream corresponding to video data captured and/or streamed by a client device associated with Participant F. The sub-region 222G may display a video stream corresponding to video data captured and/or streamed by a client device associated with Participant G. The sub-region 222H may display a video stream corresponding to video data captured and/or streamed by a client device associated with Participant H. The sub-region 222I may display a video stream corresponding to video data captured and/or streamed by a client device associated with Participant I.

In some implementations, a virtual meeting manager 122 may associate each region with a video stream received from a client device. For example, the processing device may determine that the sub-region 222A is to display a video stream from the client device of Participant A (e.g., based on an identifier associated with each client device and/or each participant). In some implementations, this may be done automatically without any user input specifying which video stream is to be displayed at the region 222A within the UI 200.

In some implementations, the UI 200 may also include an options region (not illustrated in FIG. 2A) for providing selectable options to adjust display settings (e.g., a size of each region, a number of regions, a selection of a video stream, etc.), invite additional users to participate, etc. In some implementations, the UI 200 may include a UI element (e.g., an icon) (not illustrated in FIG. 2A) that corresponds to a self-view indicator, which may indicate to a participant if the participant's video stream is displayed in a region in the UI.

In some implementations, the UI 200 may include a scrollable region 212 that is beside the main region 210. In some embodiments, as seen in FIG. 2A, scrollable region 212 may be used to present text data associated with the meeting, such as a list of meeting attendees. In some embodiments, scrollable region 212 may be used to display a list of participants of the virtual meeting 122. It is noted that a participant of the virtual meeting may be displayed in the list of participants of the virtual meeting within the scrollable region 212 but not displayed within main region 210. For example, referring to FIG. 2A, Participant J is a participant of the virtual meeting as indicated by the scrollable region 212, but is not currently displayed within the main region 210, as illustrated. The virtual assistant may also be treated similarly (e.g., if and once the virtual assistant has joined the meeting).

In some embodiments, scrollable region may be designed or otherwise configured for user interaction. Either by presenting a subregion to receive text from a user, or presenting indicia, or options, or buttons, etc. as a way to gather information from a user. In some embodiments, scrollable region 212 may provide a subregion for textual input from a user. In some embodiments, scrollable region 212 may be used to receive inquires, commands, or any other types of communications from a user of a client device. In some embodiments, these communications may be transmitted to other users, or to the virtual assistant, or generative AI model associated with the system. In some embodiments, the scrollable region 212 may be an expandable/collapsible region. In response to a user interaction with a UI element (not shown), the processing device may cause the scrollable region 212 to disappear and region 210 to be expanded into the portion of the UI 200 previously occupied by the scrollable region.

In some embodiments, alternate text data may be displayed in scrollable region 212, including, but not limited to, data or facts associated with the meeting, a meeting transcript, calendar information, organizational information, or any other type of textual data commonly used, or that would be advantageous to use, during a virtual meeting. One of ordinary skill in the art, having the benefit of this disclosure, will be able to design multiple uses, shapes, sizes, placements, and/or data to associated with scrollable region 212.

In some embodiments, the UI 200 (e.g., as presented to a user via a client device 103) can be modified according to any event, request, and/or action associated with the virtual meeting. By way of a non-limiting example, the UI controller 126 may detect when a user is presenting, and, in response to the detection, modify the main region size and scrollable region size (or any number of UI regions) so as to focus on a presentation and the presenting user.

In some embodiments, a video stream processor 124 may determine video streams to be provided for presentation in the UIs during the virtual meeting. For example, one or more participants of the virtual meeting may be identified and included in the subset of participants for presentation of their respective video streams in the UI of a client device(s) associated with a first user. In some embodiments, the video stream processor 124 may modify a position or a size of one or more video streams, such to cause one or more of the video streams to be rearranged in the UI. Once the video stream processor has determined video streams for presentation in the UI, the video stream processor 124 can provide a notification to a UI controller 126 (as seen in FIG. 1) (e.g., via network 105, via a bus) of the determined video streams.

In some embodiments, the user may interact with the UI 200 to cause a modification of a size or a position of video streams displayed within the UI 200. For example, the user may use an input device (e.g., a keyboard, a touch screen etc.) or a cursor device (e.g., a mouse) associated with the client device to cause a modification of the size or the position of the video streams displayed within the UI 200. In some embodiments, the user may cause a modification of the position of the video streams from the main region 210. For example, in response to a user interaction, the video stream of participant A may be moved from region 222A to region 222I and overlay existing UI elements within the region 222I. One of ordinary skill in the art, having the benefit of this disclosure, will be able to design and implement a variety of ways that a user can modify the UI to their liking, while still achieving similar results as the UI presented.

As was described with respect to FIG. 1, a virtual assistant 114 may be a participant of the virtual meeting, and may appear in UI 200 as a participant of the meeting. As is seen in an embodiment with respect to FIGS. 2A-2B, a virtual assistant 114 may be listed as a participant of the meeting in scrollable region 212. In other embodiments, a rendering of virtual assistant 114 may be shown in main region 210 and the virtual assistant avatar (as further described with respect to FIG. 2B) may be shown in place of a participant video stream (e.g., of a non-virtual participant). In some cases, the rendering of virtual avatar 114 may be a static image or, in other cases, may be a dynamic image, moving and adjusting based on the communications sent to the virtual assistant, and in response to queries, prompts, or keywords.

As was discussed with respect to FIG. 1, in some embodiments, virtual assistant 114 actively listens to, or intakes text of, the discussions and analyzes the content in real-time (e.g., through scrollable region 212 in a manner as was discussed above, or through any other textual input location presented in the UI). The virtual assistant 114 may employ several natural language techniques and machine learning techniques to intake the meeting communications data, extract relevant information, and generate insightful responses or suggestions.

In some embodiments, a participant of the virtual meeting may provide an audio data for other users of the meeting, such as a question, a command, or any other communication. Such communications may also be directed to the virtual assistant 114. In other embodiments, and by way of example, a participant of the meeting may share a document, textual data, or video data by typing a question or a note into a chat box provided at a user-interface (UI) for the participant, or choosing to share their UI display (e.g., share their screen) to other participants of the virtual meeting. The virtual assistant 114 may detect that a participant has provided audio data and/or has shared the document, textual data, video, etc. In response to the detection, virtual assistant 114 can record multiple aspects of this data, including, at the very least, what was shared, when it was shared, and by whom.

In some embodiments, a participant of the meeting may communicate to the virtual assistant 114 a request to perform an operation. By way of a non-limiting set of examples, a participant of the meeting may request (e.g., by providing audio data, textual data, video data, etc.) for the associated virtual assistant 114 to prepare meeting minutes, prepare a meeting summary, generate tasks out of action items, book a follow-up meeting, store meeting notes for later reference, retrieve meeting notes of a previous meeting, present a document, generate a response to a question, search the internet, or perform any operation that could reasonably be beneficial within a virtual meeting. One of ordinary skill in the art, having the benefit of this disclosure will be able to imagine the above listed requested operations, and more, that may be communicated to the virtual assistant.

In some embodiments, the virtual assistant may join the meeting and remain in a dormant state until a user of the virtual meeting communicates a keyword or directly addresses the virtual assistant 114. In some embodiments, a keyword communicated by a user and participant of the virtual meeting to the virtual assistant can be a predetermined phrase or cue. A user may speak or type a phrase to indicate that the virtual assistant 114 is being addressed. In some embodiments, a keyword may serve as activation trigger, indicating that the participant and user intends to initiate a command or request to the virtual assistant 114. In response to detecting that a participant and/or user has provided the keyword, assistant 114 can obtain communication data (e.g., audio data, textual data, video data, etc.) provided by the user and determine whether the communication data includes instructions or queries corresponding to the request. In some embodiments, the keyword can be customized or personalized to users and participants of the meeting, allowing for a more personalized meeting experience. Users and participants of the meeting may have the option to select their preferred keyword (e.g., via UI 134, UI 200, another UI of platform 110, etc.), enabling them to activate the virtual assistant 114 using a personalized word or phrase that corresponds to them or to an organization associated with the virtual meeting.

In some embodiments, the virtual assistant 114 can adapt to different keywords based on language preferences or regional variations and accents. The system may employ language modeling techniques and multilingual support to accommodate diverse keywords across various languages and dialects. In this way, users can engage with the virtual assistant using familiar keywords, enhancing accessibility and inclusivity.

In some embodiments, the UI may include a UI element that enables participants to mute/unmute other participants during the virtual meeting. The virtual assistant 114 may be activated in response to a user engaging with the UI element. It should be noted that in some embodiments, a UI can include other UI elements and virtual assistant can be activated in response to the user engaging with the other UI elements, as described herein.

In other embodiments, the virtual assistant 114 may be activated without detection of a keyword. Instead, virtual assistant 114 may be self-activated and communicate in an interjective manner if the virtual assistant autonomously determines that it can provide a service contributory to the communications within the virtual meeting. To accomplish such a task, the virtual assistant 114 can leverage its access to, and analysis of, real-time transcripts of an ongoing meeting. In some embodiments, the virtual assistant 114 can analyze sentiments, indicator words, and questions from within the real-time transcript to identify an impasse and/or challenge presented to the users engaging with the virtual meeting. The virtual assistant 114 associated with the meeting can then review its own capabilities in light of the impasse and/or challenge presented to the users. If the virtual assistant 114 determines that it is capable of providing relevant information, resolving an issue, or providing a suggested course of action, etc. The virtual assistant 114 may autonomously (or semi-autonomously) activate and provide aid to the users of the meeting.

In an illustrative example, a group of users and/or participants of the virtual meeting may be discussing a project during a virtual meeting and may not recall a deadline for the project discussed within a previous meeting. Virtual assistant 114 can detect that the participants are discussing the project (e.g., based on a context of the discussion during the virtual meeting). In such an example, the virtual assistant 114 can analyze the real-time transcript and determine that the participants of the meeting are at an impasse and/or challenge. In this particular example, the virtual assistant 114 can access to prior meeting transcripts (e.g., via data store 150) and can access and retrieve the data relevant to the discussion during the virtual meeting.

The virtual assistant may offer a suggestion, or ask for permission to provide assistance, prior to doing so. In other embodiments, the virtual assistant may simply proceed with attempting to resolve the impasse and/or challenge (e.g., in accordance with one or more virtual meeting settings provided by one or more participants of the virtual meeting)

The above disclosure illustrates one set of steps and logical processes that a virtual assistant may traverse prior to autonomously providing assistance to participants of a virtual meeting. However, one of ordinary skill in the art, having the benefit of this disclosure, will be able to design multiple logical steps and checks, including whether the virtual assistant asks for permission before rendering assistance, for a virtual assistant to autonomously provide assistance to participants of a meeting that are at an impasse and/or challenge.

The above disclosure illustrates an impasse and/or challenge in the form of a request for, and lack of relevant data. However, one of ordinary skill in the art, having the benefit of this disclosure, will be able to understand multiple types and versions of impasses and/or challenges faced by participants of a virtual meeting, that a virtual assistant is capable of provide assistance for, if not resolving, autonomously (or semi-autonomously).

In some embodiments, request to perform a task pertaining to the virtual meeting may be explicit and/or pre-established, such as a participant of a meeting specifically addressing the virtual assistant with a communication that is indicative of a request for the virtual assistant. For example, in a similar manner as was discussed with keywords, participants of the meeting may use any pre-established words or phrases to alert the virtual assistant of an opportunity to interject or employ its capabilities. Such pre-established phrases, words, noises, buttons, or any other kinds of inputs may be directly related to the known capabilities of the virtual assistant.

In other embodiments, explicit points of usefulness for the virtual assistant may be explicitly identified by participants but may not be pre-established in the same manner as the keywords and key phrases have been. Phrases or language that have not been pre-established, but nevertheless identify the virtual assistant and its associated capabilities to be employed can trigger a response from the virtual assistant. In non-limiting examples, intermediately addressed phrases similar to "I believe our virtual assistant should be able to handle this," or "no need to summarize the meeting, we can have the virtual assistant handle that task, can be a type of communications that explicitly identifies points of usefulness for the virtual assistant, but are not pre-established, such as calling the virtual assistant by a name or a keyword.

According to some embodiments, the above mechanisms for communicating with a virtual assistant will provide more intuitive and more natural (as well as at times, more indirect) recourse for calling on the virtual assistant.

Although two examples of phrases or language that has not been pre-established, yet serve to trigger a response from the virtual assistant have been provided, one of ordinary skill in the art, having the benefit of this disclosure, will be able to envision many such phrases that are not pre-established in the manger of names or keywords, yet serve to trigger a response from the virtual assistant.

At times, the virtual assistant may autonomously interject with a helpful action (e.g., via voice communication and/or text communication) that the virtual assistant can itself take, and only ask the participants of the meeting for permission. At other times, the virtual assistant can interject (e.g., via voice communication and/or text communication) with a helpful action that it is incapable of taking, and suggest to the participants of the meeting that they take that action.

In an embodiment, scrollable region 212 may also show alerts or message notifications 214 associated with participants of the meeting. In an embodiment, as is discussed additionally with respect to FIGS. 1 and 2B, the virtual assistant 114 may autonomously interject into the virtual meeting discussion by providing a message to participants (e.g., by updating scrollable region 212 to include one or more UI elements). In other or similar embodiments, virtual assistant 114 can provide a voice notification to participants (e.g., during the virtual meeting discussion).

As seen in FIG. 2A and new message notification 214, in such an embodiment, the arrival of a new message from any participant of the meeting, including the work done by the virtual assistant and the messages delivered, can be presented by the system in a discrete and non-obtrusive manner. A user and/or participant of the meeting can open and review the message (e.g., by engaging with a UI element associated with the notification).

FIG. 2A illustrates one embodiment where the new message is indicated discretely (e.g., via an indicator in the scrollable region). One of ordinary skill in the art, having the benefit of this disclosure, will be able to envision and design a variety of locations and mechanisms for delivering such a message and/or notification associated with a participant in a manner that is discrete, non-obtrusive, and accomplishes a similar goal as the message notification 214 in FIG. 2A.

Furthermore, in some embodiments, such a message notification may not solely notify participants of a new message. In some embodiments, the notification may be a notification associated with any one or more data relevant to a virtual meeting. Such data can include, for example (but is not limited to) that a participant has recently joined, that a participant is attempting to share a document, that a participant is requesting control, or any other notification commonly associated or useful in a virtual meeting context.

In some embodiments, the virtual assistant 114 may employ natural language processing and audio rendering methods to convert textual data from the AI model (or other sources) into synthesized speech. In some embodiments the virtual assistant may provide synthesized speech directly as audio for participants during the virtual meeting. In some embodiments, the virtual assistant may provide the speech as text in a chat box (as will be described in further detail below) for participants of the meeting to read. In some embodiments, the virtual assistant can also store its self-generated audio or text alongside human-generated audio (e.g., at data store 150 as seen in FIG. 1).

As was discussed with respect to FIG. 1, in some embodiments, the virtual assistant 114 can engage with other participants by providing real-time feedback, asking clarifying questions, or offering relevant input based on the meeting's agenda or topic. The virtual assistant 114 may employ and/or access a knowledge base, including one or more AI models as discussed with respect to FIG. 1, and access to the organization system to contribute meaningful insights, alternative perspectives, or relevant resources.

During a virtual meeting, the virtual assistant 114 may actively monitor the meeting proceedings by analyzing the audio, video, and text data exchanged among participants and performing tasks based on the analysis. The virtual assistant may utilize natural language processing and machine learning techniques to understand the context, extract relevant information, identify key insights or action items discussed, and perform tasks for the participants of the meeting.

According to embodiments of the present disclosure, the virtual assistant 114 can actively monitor the meeting proceedings by analyzing the audio, video, and text data exchanged among participants can generate real-time transcripts or summaries of the meeting discussions, capturing important points, decisions, and tasks. These transcripts or summaries can be shared with participants after the meeting, ensuring accurate documentation and facilitating follow-up actions. In some embodiments, the virtual assistant can assist participants by providing contextual information or answering questions during the meeting.

In some embodiments, virtual assistant 114 is can record and/or store communications data generated by participants of the meeting. In some embodiments, the virtual assistant can record and/or store text (and associated emojis and impressions data), audio, visual, and any other communications data generated by participants of the meeting, along with any associated metadata. Such metadata can include metadata associated with the substance of the data, including keywords, summarizations, abstract, sentiment analysis, tone analysis, language type, dialect, or any other kind of analysis or extractions from the substance of the communications data of the meeting. Other types of metadata capable of being stored and associated with the communications data include the provenance metadata of the data associate with the virtual meeting this can include, but is not limited to, data such as timestamps, and identifiers for the originating client device or originating participant, or any kind of other provenance metadata. One of ordinary skill in the art, having the benefit of this disclosure, will be able to envision many these and many other types of metadata that may be associated with the communications data.

In some embodiments, the virtual assistant can earmark the audio data or audio transcripts and identify itself as the originator of the audio data. In some embodiments, earmarking audio data or audio transcripts can include associating such audio data or audio transcripts in memory storage with a metadata that includes a variety of factors such as the time the audio data or audio transcript was received, the client device that originated the audio data (including data which the virtual assistant originated), the meeting the data is associated with, as well as any other data that one could reasonably associated with the audio data or audio transcript. One of ordinary skill in the art, having the benefit of this disclosure, will be able to envision and design multiple computer and database methods for associating (e.g., earmarking) such metadata with the audio data and transcripts. One of ordinary skill in the art, having the benefit of this disclosure, will be able to envision and design multiple computer and database methods for further types and styles of metadata to be earmarked together with the audio data and transcripts.

Participants can interact with the virtual assistant 114 using voice commands or text-based queries, and the assistant will provide relevant information or resources based on its knowledge base, access to additional systems, and/or understanding of the meeting content. In other or similar embodiments, virtual assistant 114 can proactively suggest relevant documents, files, or resources based on the ongoing meeting discussion, enabling participants to access relevant materials quickly and efficiently.

In some embodiments, the assistant may perform some tasks autonomously. In some embodiments, the virtual assistant 114 may autonomously (or at user direction) provide contextual reminders, prompt participants about upcoming deadlines or suggest action items discussed during the meeting. In addition, the virtual assistant 114 can facilitate participant engagement and collaboration. Virtual assistant 114 can initiate polls, surveys, or brainstorming sessions, collect responses from participants and/or aggregate the results in real-time. Such features encourage active participation, fosters creativity, and helps drive meaningful discussions during the meeting.

In addition, the virtual assistant 114 can facilitate participant engagement and collaboration. It can initiate polls, surveys, or brainstorming sessions, collecting responses from participants and aggregating the results in real-time. These features encourage active participation, fosters creativity, and helps drive meaningful discussions during the meeting.

The virtual assistant 114 may utilize advanced algorithms to continuously improve its performance and adapt to the specific needs of participants and organizations. Furthermore, the virtual assistant computer program may not be a static program, and may be continuously updated with improved capabilities and further advanced algorithms and techniques over time.

In some embodiments, the virtual assistant 114 may integrate into a call or meeting using an audio recording device. In some embodiments, the virtual assistant may audibly announce its presence upon joining the meeting. In some embodiments, a virtual indicator of the UI 200 may indicate that the virtual assistant 114 has joined the meeting. In some embodiment the indication that the virtual assistant 114 has joined a meeting may be similar to the indication when a human participant joins the meeting. In other embodiments it may be different.

In some embodiments, the virtual assistant 114 may join the meeting automatically, or according to a predefined schedule or time, in other embodiments a user and participant may request the virtual assistant to activate and/or join the virtual meeting. In some embodiments, the virtual assistant 114 can be activated through a button or through a request from a client device (such as client device 130A-N seen in FIG. 1).

In some embodiments, the virtual assistant 114 may interact with a user after the conclusion of a virtual meeting. An interface (e.g., other than or in addition to UI 134 as seen in FIG. 1) may be provided that allows a user to specify to the virtual assistant a request to perform a task or operation associated with data from a specific virtual meeting. The virtual assistant 114 can then perform tasks (including any task as was discussed with respect to an ongoing meeting) and/or provide a response to the user's request, in accordance with previously described embodiments.

In some embodiments, a user may specify to the virtual assistant which meeting's data and transcripts the user would like to access (e.g., via the additional UI). In some embodiments, the user may specify a meeting by way of a date, a time, participant identities (e.g., names and organizational ties), or subject matter. In some embodiments, the virtual assistant 114 may respond to the user with a request for clarification. In some embodiments, a user may specify to the virtual assistant which meeting's data and transcripts the user would like to access (e.g., via the additional UI). In some embodiments, the user may provide an indication of a meeting by way of a date, a time, participant identities (e.g., names and organizational ties), or subject matter. In some embodiments, the virtual assistant may respond to the user with a request for clarification.

FIG. 2B illustrates an example user interface (UI) 202 with a virtual avatar for a virtual assistant 114 in accordance with implementations of the present disclosure. In some embodiments, UI 202 may include a layout with a focus region 252, a subregion 254, and a side region 260, to illustrate visual items. In some embodiments, UI 202 may include a layout where a focus region 252 is presented in a UI to display a video stream of a participant who is actively speaking in the virtual meeting. Aspects and implementations of the present disclosure may function in cooperation with such existing techniques. For example, the processing device may determine focus region 252 of the UI 202 is dedicated to display the video stream of the participant who is actively speaking in the virtual meeting; in some embodiments, as will be discussed below, this may be the virtual assistant. In other embodiments, the video stream may be of a human presenter.

The processing device may determine other video streams (e.g., 254A-N, in a similar manner as video stream managing was described with respect to FIG. 1) to be provided for presentation within subregion 254 of the UI 202 according to the techniques described herein.

As described above, video streams of a subset of participants of the video conference may be provided for display within the UI 202. The processing device may include one or more participants from a subset of all participants and may refrain from including one or more other participants. However, in some instance, there may be sufficient area in the UI to include video streams of all participants. The virtual meeting manager 122 may modify a position or a size of one or more of the displayed video streams, including the video stream of the virtual assistant avatar, such as to cause the one or more of the displayed video streams be rearranged in the UI for presentation within the focus region 252.

As illustrated, UI 202 may include a focus region 252, e.g., one or more areas in the UI 202 that are placed at or near the center or a focus area of the UI 202, and are meant to take up more space, and be a focus of the UI. In some embodiments, the subregion 254 may correspond to "thumbnail regions," and include any number of thumbnails (e.g., in UI 202, thumbnails 254A, 254I, and 254N are shown) corresponding to video inputs from any of the total participants of the meeting. A thumbnail region may refer to an area of the UI 202 that may be located along a side (e.g., a bottom side) of the UI 202. Similar to the focus region 252, the subregion 254 is also associated with a video stream received from the client device, or the virtual assistant avatar, and displays one or more video streams. However, the subregion spans a smaller area than the focus region 252, thereby presenting images of the associated video stream in a relatively smaller scale than the focus region.

In some embodiments, virtual meeting manager 122 may provide multiple UI layouts and cause the UI to switch to one of the multiple UI layouts responsive to detecting a participant in the virtual meeting is performing a meaningful action, such as presenting a document, or speaking. For example, the processing device may cause the UI 200 of FIG. 2A to switch to the UI 202 in response to detecting a participant in the virtual meeting decides to share a document, application, or their interface screen.

In some embodiments, the virtual assistant may have an avatar to provide a visual representation associated with the virtual assistant, for users and/or participants to interact with. In some embodiments, the presence of a virtual assistant may be demonstrated more discretely (. In some embodiments, the virtual assistant avatar may be shown in focus region 252, such as when a user activates the virtual assistant through use of a keyword or query, or when the virtual assistant wants to interject, or deliver a message. In some embodiments, UI controller may place the virtual assistant avatar in a focus region whenever the virtual assistant is giving an audio and/or a textual communication to participants of the group meeting. As was discussed with respect to FIG. 1, the virtual assistant avatar may serve as a visual representation of the virtual assistant and interact with users in a dynamic manner.

In some embodiments, the virtual avatar may be rendered with lifelike (or almost lifelike) characteristics, (e.g., resembling a human form). In some embodiments, the virtual avatar may have facial expressions, gestures, body movements, etc. to convey emotions and responses. In some embodiments, the virtual avatar may mimic natural human behaviors, and/or augment them, including making use of providing natural language as audio or text in tandem with a virtual avatar as a participant of the virtual meeting. In further embodiments, the virtual avatar may adapt its appearance and/or behavior based on user preferences or contextual factors. Users and participants of the meeting may be offered a list of options (e.g., via UI 134 as seen in FIG. 1, or another UI) of available avatar features for the virtual avatar.

In some embodiments, the virtual avatar may automatically change or adapt to a specific communication style, tone, or language based on user preferences, or the nature of the communications, or details inherent to the virtual meeting. In such a manner, the virtual avatar may serve as an immersive and seamless mechanism for participants of the virtual meeting to provide and receive communications data to and from the virtual assistant and its associated systems (such as AI model 145 and organizational systems 162 associated with the virtual meeting and seen in FIG. 1).

In some embodiments, text messages may be delivered within the focus region 252, as seen in FIG. 2B, as the virtual assistant delivers audio via a text-to-speech natural language processing engine. In other embodiments, text messages from the virtual assistant can be delivered in a side region 260. In some embodiments, concurrently with delivery in the focus region 252.

In some embodiments, scrollable region 212 from FIG. 2A may be updated to include and/or may be replaced by a similarly sized side region 260. In some embodiments, side region 260 may serve as a textual interface for participants of the meeting, including the virtual assistant. In some embodiments, the virtual assistant may use the side region to transmit a textual question or response, as well as provide a document, link, or other accessible item to participants of the meeting.

In other embodiments, participants of the meeting may use side region to take notes, publish messages, or provide keywords, prompts, or queries to the virtual assistant in the meeting. In some embodiments, the virtual assistant may be dormant, and not appear visually until a participant of the meeting provides a keyword through the side region 260 to the virtual assistant. In other embodiments, a keyword may be spoken.

As indicated with respect to FIG. 2A, the virtual assistant 114 can provide participants with a response to a prompt or query detected during a virtual meeting. In some embodiments, the virtual meeting UI (e.g., UI 200, UI 202) can be updated to include one or more UI elements that indicate that a response to the prompt or query is available for participants to review. In other or similar embodiments, the one or more UI elements can indicate (e.g., in response to a user interaction with a UI element) information pertaining to the response.

FIGS. 2A and 2B illustrate two exemplary embodiments of UIs to be presented to participants of the virtual meeting. However, one of ordinary skill in the art, having the benefit of this disclosure, will be able to design and implement many more configurations, or embodiments for UIs to be presented to participants of a meeting, while still allowing for a virtual assistant in all the described functionality.

Figure 3:
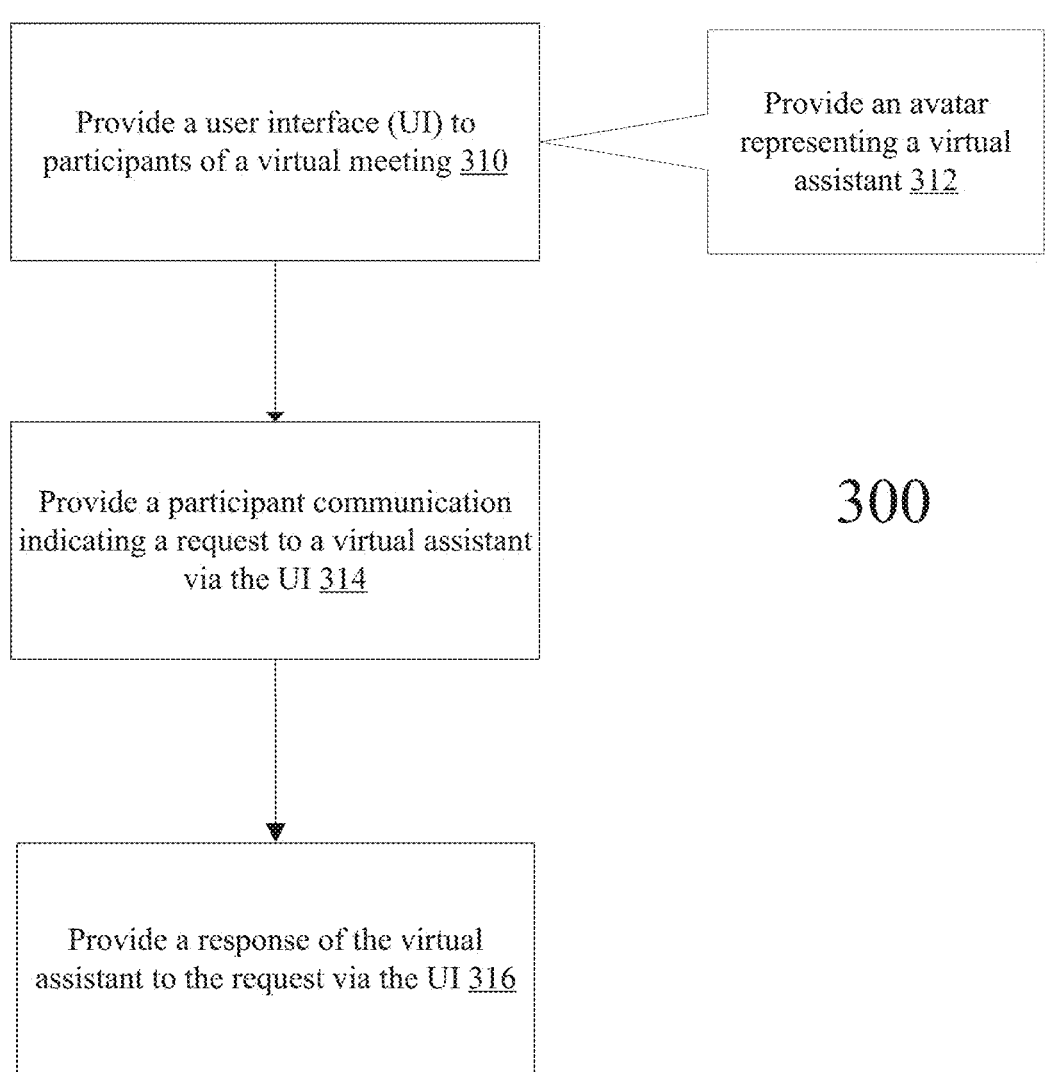
FIG. 3 is a flow diagram of an example method for providing visual items to participants of a virtual meeting, in accordance with implementations of the present disclosure.

FIG. 3 is a flow diagram of an example method 300 for providing visual items to participants of a virtual meeting, in accordance with implementations of the present disclosure. Method 300 can be performed by processing logic that can include hardware (circuitry, dedicated logic, etc.), software (e.g., instructions run on a processing device), or a combination thereof. In one implementation, some or all of the operations of method 300 can be performed by one or more components of system 100 of FIG. 1. In some embodiments, some or all of the operations of method 300 can be performed by virtual meeting manager 122 (as seen in FIG. 1), as described above.

At block 310, processing logic provides a user interface (UI) to participants of a virtual meeting. The UI can be provided for presentation on each client device participating in the virtual meeting. The UI includes visual items each corresponding to one of the participants. At block 312, processing logic provides a virtual avatar representing a virtual assistant. The virtual assistant can have a role of one of the participants.

At block 314, processing logic provides a participant communication indicating a request to a virtual assistant via the UI. The participant communication can be provided during the virtual meeting. The communication of the first participant can indicate a request to perform an operation. In some embodiments, the indicated request includes a phrase spoken by the first participant or a text message entered by the first participant in the UI. In some embodiments, the phrase or the text message has one of one or more predefined prompt formats. In some embodiments, the phrase or the text message includes content associated with an inferred prompt. In some embodiments, the requested operation can include preparation of meeting minutes, preparation of a meeting summary, generating tasks out of action items, booking a follow-up meeting, storing meeting notes for later reference, retrieving meeting notes of a previous virtual meeting, presenting a document, or generating a response to one or more questions.

At block 316, processing logic provides a response of the virtual assistant to the request via the UI. The response can be provided via the UI during the virtual meeting. The response of the virtual assistant can include at least one of a textual response or an audio response. In some embodiments, the response of the virtual assistant can include at least one of a response to the one or more questions, a follow-up question related to the one or more questions, or a confirmation that the one or more requested operations have been performed.

Figure 4:
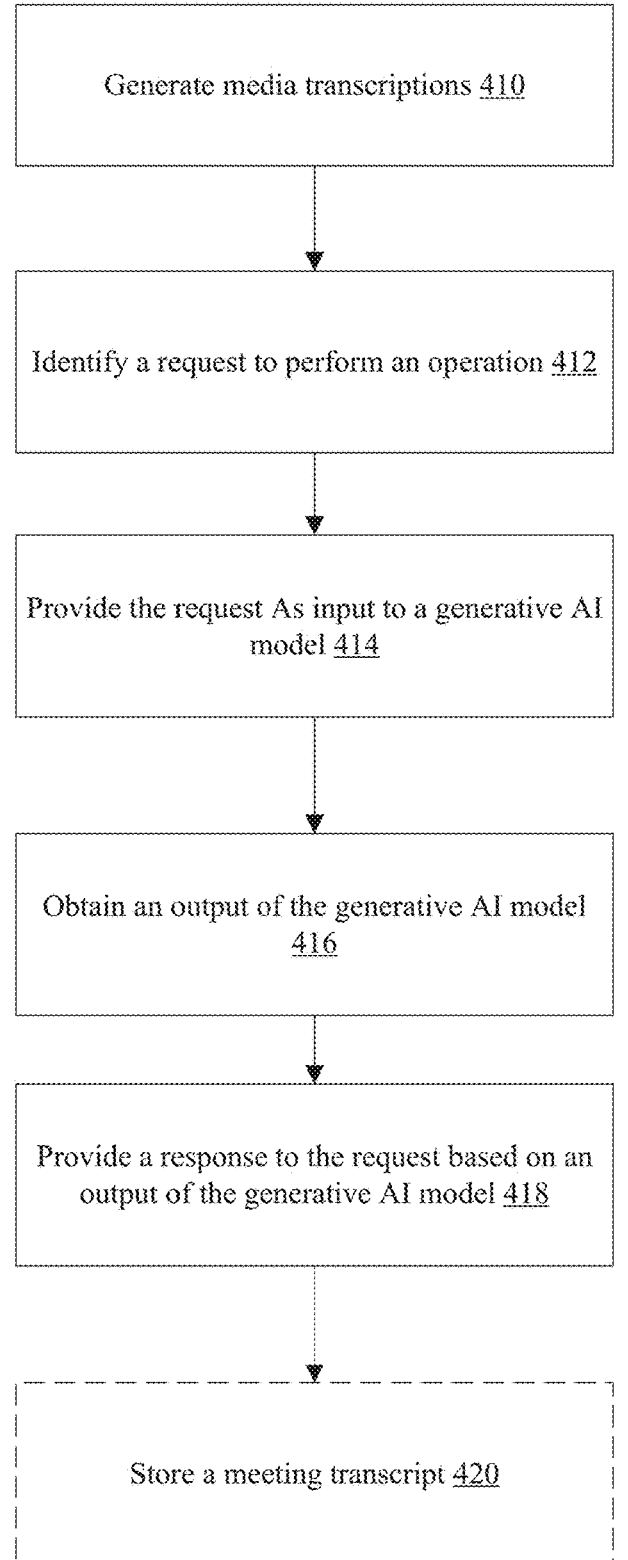
FIG. 4 is a flow diagram of an example method for virtual meeting participants to interface with a generative AI model during a virtual meeting, in accordance with implementations of the present disclosure.

FIG. 4 is a flow diagram of an example method 400 for virtual meeting participants to interface with a generative AI model during a virtual meeting, in accordance with implementations of the present disclosure. Method 400 can be performed by processing logic that can include hardware (circuitry, dedicated logic, etc.), software (e.g., instructions run on a processing device), or a combination thereof. In one implementation, some or all of the operations of method 400 can be performed by one or more components of system 100 of FIG. 1. In some embodiments, some or all of the operations of method 400 can be performed by virtual meeting manager 122 and/or predictive system 180, as described above.

At block 410, processing logic generates media transcriptions of media streams generated by one or more client devices associated with participants of a virtual meeting. A media transcription can include a communication of a participant during the virtual meeting.

At block 412, processing logic identifies, based on the media transcriptions, a request to perform an operation. Processing logic can identify the request during the virtual meeting, in some embodiments. In some embodiments, processing logic can identify the request by determining that a communication provided by a participant indicates the request to perform the operation. Processing logic can determine that the communication includes the request by analyzing one or more portions of the media transcriptions to determine whether the analyzed portions correspond to a request to perform an operation. The request can include a communication of the participant of the multiple participants indicating a request to perform an operation. In some embodiments, the request includes a phrase spoken by the first participant or a text message entered by the first participant in the UI. In some embodiments, the phrase or the text message has one of one or more predefined prompt formats. In some embodiments, the phrase or the text message includes content associated with an inferred prompt. In some embodiments, the requested operation can include preparation of meeting minutes, preparation of a meeting summary, generating tasks out of action items, booking a follow-up meeting, storing meeting notes for later reference, retrieving meeting notes of a previous virtual meeting, presenting a document, or generating a response to one or more questions.

The request can include a keyword that is associated providing a request to the virtual assistant, as described above. Processing logic can determine that the communication includes the request by detecting the keyword in the phrase, in some embodiments. In other or similar embodiments, processing logic can determine that the communication includes the request based on an analysis of the context of the request, as described above. For example, processing logic can determine, based on an analysis of the request, that the request includes a statement such as "I want to be excluded from next week's meeting, as I will not be able to attend." Processing logic can determine, based on a context of the statement, that the participant does not want to attend the meeting and can provide a message to the participant (or another participant responsible for scheduling the following meeting) that the participant should be removed from the following meeting's guest list.

At block 414, processing logic can include providing the request as input to a generative AI model. This can include providing the communication indicating the request to perform an operation as input to a generative AI model. In some embodiments, processing logic can form an input data by combining the communication indicating the request with a portion of the one or more media transcriptions. The portion of the one or more media transcriptions includes communications of the participants of the virtual meeting up until a point in time that the communication indicating a request is received. The input data is provided as input to the generative AI model.

At block 416, processing logic can obtain an output of the generative AI model. In some embodiments, the generative AI model has been pre-trained on a corpora of text to create a foundation model. In some embodiments, the generative AI model has been fine-tuned on proprietary organizational data. In some embodiments, the generative AI model has been fine-tuned for application to a virtual meeting.

At block 418, processing logic provides a response to the request during the virtual meeting using the outputs of the generative AI model. In some embodiments, the response to the indicated request is at least one of a response to the one or more questions, a follow-up question related to the one or more questions, or a confirmation that the one or more requested operations have been performed.

At block 420, processing logic, optionally, stores a meeting transcript associated with the one or more media transcriptions. Processing logic can associate each media transcription of the one or more media transcriptions with a metadata including a time-stamp indicative of when the communication associated with the media transcription was received and/or a participant identifier identifying a participant of the multiple participants that produced the communication associated with the media transcription. In some embodiments, processing logic can store a meeting transcript including the one or more media transcriptions and metadata to a memory device (e.g., a persistent memory device) at a conclusion of the virtual meeting.

FIG. 5A is a flow diagram of an example method 500 for a virtual assistant to perform an operation with a generative AI model after the conclusion of a virtual meeting, in accordance with implementations of the present disclosure. Method 500 can be performed by processing logic that can include hardware (circuitry, dedicated logic, etc.), software (e.g., instructions run on a processing device), or a combination thereof. In one implementation, some or all of the operations of method 500 can be performed by one or more components of system 100 of FIG. 1. In some embodiments, some or all of the operations of method 500 can be performed by virtual meeting manager 122 and/or predictive system 180 (as seen in FIG. 1), as described above.

At block 510, processing logic can obtain a meeting transcript. The meeting transcript can include media transcriptions generated from media streams generated by one or more client devices associated with participants of the virtual meeting. In some embodiments, processing logic can obtain the meeting transcript from a memory device (e.g., a persistent memory device) based on a meeting identifier associated with the virtual meeting.

At block 512, processing logic can provide a prompt and the obtained transcript as input to a generative AI model. Processing logic can provide at least a portion of the meeting transcript and a machine-generated prompt (or the communication indicative of a request) as input to the generative AI model. The AI model can be trained to perform multiple operations pertaining to the virtual meeting. The machine-generated prompt includes a request to perform an operation pertaining to the virtual meeting. In some embodiments the requested operation includes at least one of generating a summarization of the one or more media transcriptions, generating meeting minutes from the one or more media transcriptions, or suggesting future tasks based on the one or more media transcriptions.

At block 514, processing logic obtains an output of the generative AI model. The output can include a result of the performed operation. In some embodiments, the result of the performed operation includes at least one of a summarization of the one or more media transcriptions, meeting minutes from the one or more media transcriptions, or suggested future tasks based on the one or more media transcriptions.

FIG. 5B is a flow diagram of an example method 550 for users to interface with a generative AI model after the conclusion of a virtual meeting, in accordance with implementations of the present disclosure. Method 550 can be performed by processing logic that can include hardware (circuitry, dedicated logic, etc.), software (e.g., instructions run on a processing device), or a combination thereof. In one implementation, some or all of the operations of method 550 can be performed by one or more components of system 100 of FIG. 1. In some embodiments, some or all of the operations of method 550 can be performed by virtual meeting manager 122 and/or predictive system 180 (as seen in FIG. 1), as described above.

At block 560, processing logic receives a request to perform an operation pertaining to a virtual meeting. The request can be received from a client device of a user.

At block 562, processing logic obtains a meeting transcript. The meeting transcript can include media transcriptions generated from media streams provided by one or more client devices associated with participants of the virtual meeting. In some embodiments, processing logic can obtain the meeting transcript by identifying a meeting identifier within the communication indicating the request to perform the operation relating to a virtual meeting. Processing logic can access the meeting transcript associated with the meeting identifier at a memory device (e.g., a persistent memory device). In some embodiments, processing logic can identify the meeting identifier by providing a response to a client device that provided the media stream corresponding to the communication indicating the request. The request can include an additional request for further information associated with the meeting identifier. In some embodiments, the meeting identifier includes at least one of a date, a time, or a meeting subject.

At block 564, processing logic provides the request and at least a portion of the meeting transcript to a generative AI model. The generative AI model can be trained to perform multiple operations pertaining to a virtual meeting, at least one operation corresponding to the request indicated by the communication. In some embodiments the requested operation includes at least one of generating a summarization of the one or more media transcriptions, generating meeting minutes from the one or more media transcriptions, or suggesting future tasks based on the one or more media transcriptions.

At block 566, processing logic obtains an output of the generative AI model, the output can include a result of the performed operation. In some embodiments, the result of the performed operation includes at least one of a summarization of the one or more media transcriptions, meeting minutes from the one or more media transcriptions, or suggested future tasks based on the one or more media transcriptions.

At block 568, processing logic provides a response to the request. The response to the request can be provided using the output of the generative AI model.

Figure 6:
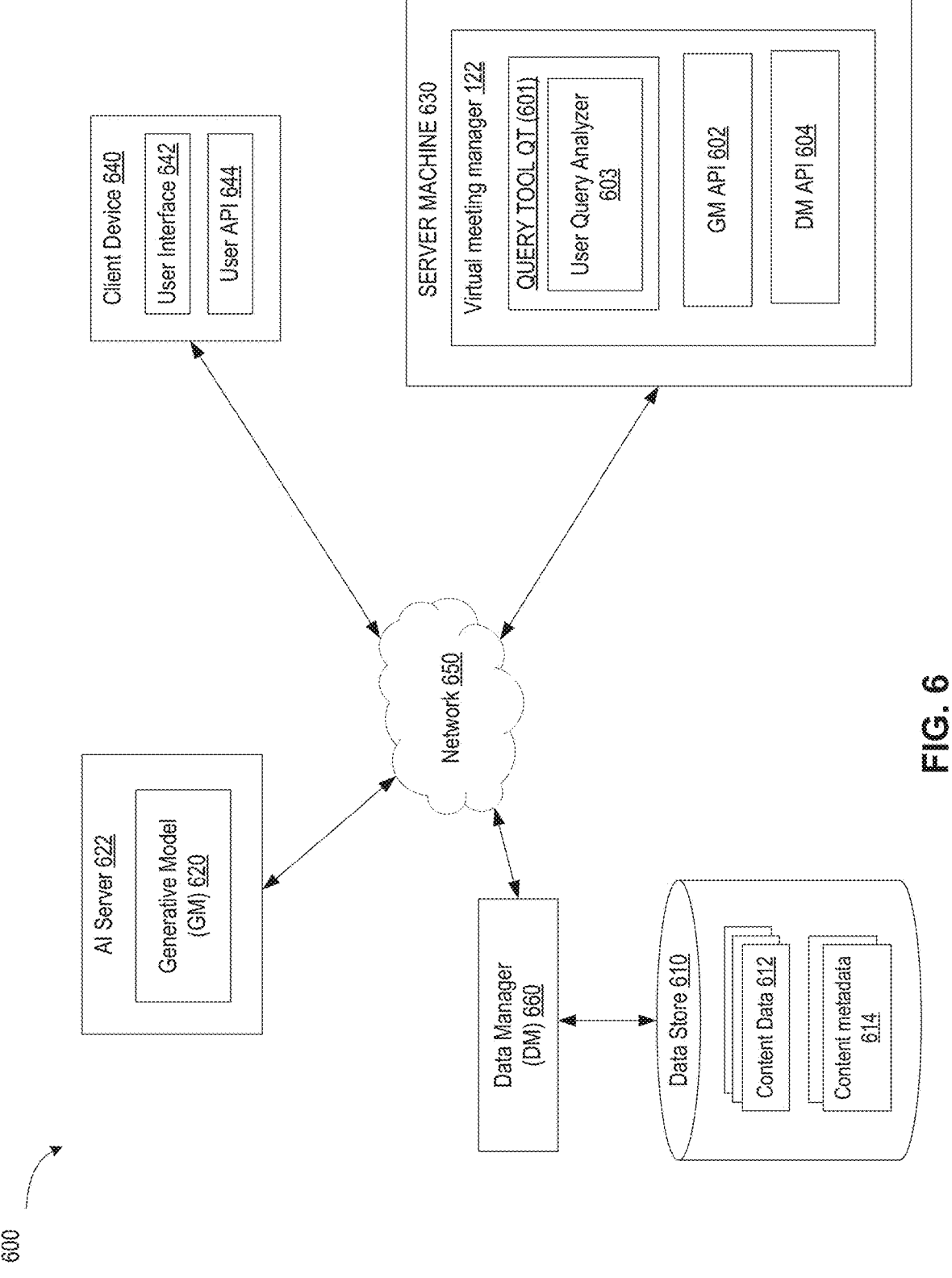
FIG. 6 illustrates a high-level component diagram of an example system architecture for a generative machine learning model, in accordance with one or more aspects of the disclosure.

FIG. 6 illustrates a high-level component diagram of an example system architecture 600 for a generative machine learning model, in accordance with one or more aspects of the disclosure. The system architecture 600 (also referred to as "system" herein) includes a data store 610, a generative model 620 provided by AI server 622, a server machine 630 with a query tool (QT) 501, one or more client devices 640, and/or other components connected to a network 650. In some embodiments, system 600 can be a part of or can be included in predictive system 140, as described above. In additional or alternative embodiments, client device(s) 640 can correspond to or can include client devices 103, as described with respect to FIG. 1. Network 650 can correspond to network 105 of FIG. 1 and/or can correspond to another network, as described herein. The system architecture 600 (also referred to as "system" herein) includes a server machine 630 including or otherwise connected to virtual meeting manager 122.

In some embodiments, network 605 may be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), and/or the like (in some embodiments, network 605 may be similar to network 105 of FIG. 1). In some embodiments, network 605 may include routers, hubs, switches, server computers, and/or a combination thereof.

In some embodiments, any of AI server 622, server machine 620, platform 110, and/or client device(s) 640 may include a desktop computer, a laptop computer, a smartphone, a tablet computer, a server, a scanner, or any suitable computing device capable of performing the techniques described herein. In some embodiments, any of server machine 620, platform 610 and/or client device(s) 640 may be (and/or include) one or more computer systems 100 of FIG. 1.

The system architecture 600 (also referred to as "system" herein) includes an AI server 622 including a generative model (GM) 620 (also referred to herein as a generative AI model). GM 620 can be or can otherwise correspond to AI model 145, described with respect to FIG. 1. A generative AI model can include an AI model that is trained to generate new, original data based on given inputs. GM 620 can be trained according based on a corpus of data, as described herein.

A generative AI model can deviate from a machine learning model based on the generative AI model's ability to generate new, original data, rather than making predictions based on existing data patterns. As described above, a generative AI model can include a generative adversarial network (GAN) and/or a variational autoencoder (VAE). In some instances, a GAN, a VAE, and/or other types of generative AI models can employ a different approach to training and/or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

With respect to GM 620 (and/or AI model 145), GM 620 can be trained by AI server 622 (or another server or computing device of system 600), in some embodiments. In an illustrative example, a training set generator (not shown) of AI server 622 can initialize a training set T to null (e.g., { }). The training set generator can identify data corresponding to a phrase provided by a user of a platform (e.g., a user of platform 110 or another platform). In some embodiments, the phrase may be provided by the user when the user is a participant of a virtual meeting (e.g., a video-based conference call, an audio-based conference call, etc.). The training set generator can determine whether the phrase corresponds to a statement associated with a request for an action pertaining to a virtual meeting. In some embodiments, the training set generator can determine whether the phrase corresponds to a request pertaining to a virtual meeting based on input provided by a developer and/or engineer of system 600 (e.g., via a client device 640). In other or similar embodiments, the phrase can be included in a transcript of a virtual meeting (e.g., generated after completion of the virtual meeting). The training set generator can determine whether the phrase corresponds to an information access and/or information sharing statement by determining whether one or more actions (e.g., of a set of actions) were performed with respect to the virtual meeting in connection with the phrase. The training set generator can determine whether the electronic document was shared with participants in connection with the phrase by determining whether the action was performed within a threshold amount of time after the phrase was provided by the participant and/or whether the performed action corresponds to a context of the discussion during a time period (e.g., defined by the engineer and/or developer of system 600) before and/or after the phrase was provided.

The training set generator can generate an input/output mapping, in some embodiments. The input can be based on the identified data that includes the phrase and the outputs can indicate whether the phrase corresponds to a request pertaining to a virtual meeting (e.g., in accordance with the determination by the training set generator). The training set generator can add the input/output mapping to the training set T and can determine whether training set T is sufficient for training GM 620. Training set T can be sufficient for training GM 620 if training set T includes a threshold amount of input/output mappings, in some embodiments. In response to determining that training set T is not sufficient for training, the training set generator can identify additional data that indicates additional phrases provided by users of platform 110 and can generate additional input/output mappings based on the additional data. In response to determining that training set T is sufficient for training, the training set generator can provide training set T to GM 620. In some embodiments, the training set generator provides the training set T to a training engine.

As mentioned above, GM 620 can be trained to determine the context of a given input text through its ability to analyze and understand surrounding words, phrases, and patterns within the given input text. The training set generator can identify or otherwise obtain sentences (or parts of sentences) of phrases provided by users of platform 110, in some embodiments. The (e.g., audio phrases, textual phrases, etc.) phrases can be provided during a virtual meeting and/or while the users access other applications provided by the platform 110 (e.g., search application, collaborative document application, content sharing application, etc.). The phrases can be included in content produced or retrieved from other sources of the Internet and/or any other database accessible by the training set generator and/or GM 620. The training set generator can generate an input/output mapping based on the obtained sentences (or parts of sentences). The input can include a portion of an obtained sentence of a phrase. Another portion of the obtained sentence or phrase is not included in the input. The output can include the complete sentence (or part of the sentence), which includes both the portion included in the input and the additional portion that is not included in the input. In accordance with embodiments of the present disclosure, the training set generated by the training set generator to train GM 620 can include a significantly large amount of input/output mappings (e.g., millions, billions, etc.). In some embodiments, multiple input/output mappings of the training set can correspond to the same sentence (or part of the sentence), where the input of each of the input/output mappings include a different portion of the sentence (or part of the sentence).

In some embodiments, the sentences used to generate the input/output mapping of the training set can be obtained from phrases included in electronic documents (e.g., collaborative electronic documents, web page documents, etc.). In such embodiments, the training set generator can determine a context of one or more portions of content of an electronic document. For example, the training set generator can provide a portion of content as input to another machine learning model that is trained to predict a context of the content. the training set generator can update an input/output mapping corresponding to the sentence included in the electronic document to include the determined context. In other or similar embodiments, the training set generator can update the input/output mapping for the sentence to include an indicator of the electronic document (e.g., a pointer or link to the document, a memory address or a web address for the electronic document).

A training engine (not shown) can train GM 620 using the training data (e.g., training set T) from the training set generator. A validation engine (not shown) may be capable of validating a GM 620 using a corresponding set of features of a validation set from the training set generator. The validation engine may determine an accuracy of each of the trained GMs 620 based on the corresponding sets of features of the validation set. The validation engine may discard a trained GM 620 that has an accuracy that does not meet a threshold accuracy. In some embodiments, a selection engine not shown) may be capable of selecting a GM 620 that has an accuracy that meets a threshold accuracy. In some embodiments, the selection engine may be capable of selecting the trained GM 620 that has the highest accuracy of the trained GMs 620.

A testing engine (not shown) may be capable of testing a trained GM 620 using a corresponding set of features of a testing set from the training set generator. For example, a first trained GM 620 that was trained using a first set of features of the training set may be tested using the first set of features of the testing set. The testing engine may determine a trained GM 620 that has the highest accuracy of all of the trained machine learning models based on the testing sets.

It should be noted that AI server 622 can train the GM 620 in accordance with embodiments described herein and/or in accordance with other techniques for training a large language model. For example, GM 620 may be trained on a large amount of data, including prediction of one or more missing words in a sentence, identification of whether two consecutive sentences are logically related to each other, generation of next texts based on prompts, etc.

In some embodiments, data store 610 (database, data warehouse, etc.) may store any suitable raw and/or processed data, e.g., content data 612. For example, content data 612 may include any communications content associated with a virtual meeting, including communications, audio, text, impression, emojis, etc. Content data 612 may also include user's consent to store user's content data and/or use user's data in information exchanges with generative model (GM) 620. Data store 610 may further store content metadata 612.

System 600 may further include a data manager (DM) 660 that may be any application configured to manage data transport to and from data store 610, e.g., retrieval of data and/or storage of new data, indexing data, arranging data by user, time, type of activity to which the data is related, associating the data with keywords, and/or the like. DM 660 may collect data associated with various user activities, e.g., content pertaining to a virtual meeting, applications, internal tools, and/or the like. DM 660 may collect, transform, aggregate, and archive such data in data store 610. In some embodiments, DM 660 may support a suitable software that, with user's consent, resides on client device(s) 640 and tracks user activities. For example, the DM-supported software may capture user-generated content and convert the captured content into a format that can be used by various content destinations. In some embodiments, the DM-supported software may be a code snippet integrated into user's browsers/apps and/or websites visited by the user. Generating, tracking, and transmitting data may be facilitated by one or more libraries of DM 660. In some embodiments, data may be transmitted using messages in the JSON format. A message may include a user digital identifier, a timestamp, name and version of a library that generated the message, page path, user agent, operating system, settings. A message may further include various user traits, which should be broadly understood as any contextual data associated with user's activities and/or preferences. DM 660 may track different ways the same user DM 660 may facilitate data suppression/deletion in accordance with various data protection and consumer protection regulations. DM 660 may validate data, convert data into a target format, identify and eliminate duplicate data, and/or the like. DM 660 may aggregate data, e.g., identify and combine data associated with a given user in the user's profile (user's persona), and storing the user's profile on a single memory partition. DM 660 may scan multiple user's profiles to identify and group users that are related to the same organization, activity, interests, and/or the like. DM 660 may scan numerous user's actions and identify user's profiles associated with multiple uses of a particular resource (e.g., a virtual meeting). DM may ensure reliable delivery of data from user profiles (user personas) to recipients of that data, e.g., by tracking and re-delivering (re-routing) data whose transmission failed.

Data store 610 may be implemented in a persistent storage capable of storing files as well as data structures to perform identification of data, in accordance with embodiments of the disclosure. Data store 610 may be hosted by one or more storage devices, such as main memory, magnetic or optical storage disks, tapes, or hard drives, network-attached storage (NAS), storage area network (SAN), and so forth. Although depicted as separate from the server machine 620, data store 610 may be part of server machine 620, and/or other devices. In some embodiments, data store 610 may be implemented on a network-attached file server, while in other embodiments data store 610 may be implemented on some other types of persistent storage, such as an object-oriented database, a relational database, and so forth, that may be hosted by a server machine 620 or one or more different machines coupled to server machine 620 via network 605.

Server machine 630 may include QT 601 configured to perform automated identification and facilitate retrieval of relevant and timely contextual information for quick and accurate processing of user queries by generative model 620, as disclosed herein. In some embodiments, QT 601 may be implemented by virtual meeting manager 122. It can be noted that a user's request for an operation pertaining to a virtual meeting can be formed into a query that uses QT 601 in some embodiments. Via network 650, QT 601 may be in communication with one or more client devices 640, AI server 622, and data store 610, e.g., via DM 660. Communications between QT 601 and AI server 622 may be facilitated by GM API 602. Communications between QT 601 and data store 610/DM 660 may be facilitated by DM API 604. Additionally, GM API 602 may translate various queries generated by QT 601 into unstructured natural-language format and, conversely, translate responses received from generative model 620 into any suitable form (including any structured proprietary format as may be used by QT 601). Similarly, DM API 604 may support instructions that may be used to communicate data requests to DM 660 and formats of data received from data store 610 via DM 660.

A user (e.g., participant, etc.) may interact with QT 601 via a user interface (UI) 642. In some embodiments, UI 642 may be similar to UI 624 of FIG. 1. In some embodiments, UI 642 may be implemented in UI 134 of FIG. 1. For example, UI 642 can be a UI element of UI 134. UI 642 may support any suitable types of user inputs, e.g., content from one or more UI elements, speech inputs (captured by a microphone), text inputs (entered using a keyboard, touchscreen, or any pointing device), camera (e.g., for recognition of sign language), and/or the like, or any combination thereof. UI 642 may further support any suitable types of outputs, e.g., speech outputs (via one or more speaker), text, graphics, and/or sign language outputs (e.g., displayed via any suitable screen), file for a word editing application, and/or the like, or any combination thereof. In some embodiments, UI 642 may be a web-based UI (e.g., a web browser-supported interface), a mobile application-supported UI, or any combination thereof. UI 642 may include selectable items. In some embodiments, UI 642 may allow a user to select from multiple (e.g., specialized in particular knowledge areas) generative models 620. UI 642 may allow the user to provide consent for QT 601 and/or generative model 620 to access user data previously stored in data store 610 (and/or any other memory device), process and/or store new data received from the user, and the like. UI 642 may allow the user to withhold consent to provide access to user data to QT 601 and/or generative model 620. In some embodiments, user inputs entered via UI 642 may be communicated to QT 501 via a user API 644. In some embodiments, UI 642 and user API 644 may be located on client device 640 that the user is using to QT 601. For example, an API package with user API 644 and/or user interface 642 may be downloaded to client device 640. The downloaded API package may be used to install user API 644 and/or user interface 642 to enable the user to have two-way communication with QT 601.

QT 601 may include a user query analyzer 603 to support various operations of this disclosure. For example, user query analyzer 603 may receive a user input, e.g., user query, and generate one or more intermediate queries to generative model 620 to determine what type of user data GM 620 might need to successfully respond to user input. Upon receiving a response from GM 620, user query analyzer 603 may analyze the response, form a request for relevant contextual data for DM 660, which may then supply such data. User query analyzer 603 may then generate a final query to GM 620 that includes the original user query and the contextual data received from DM 660. In some embodiments, user query analyzer 603 may itself include a lightweight generative model that may process the intermediate query(ies) and determine what type of contextual data may have to be provided to GM 620 together with the original user query to ensure a meaningful response from GM 620.

QT 601 may include (or may have access to) instructions stored on one or more tangible, machine-readable storage media of server machine 630 and executable by one or more processing devices of server machine 630. In one embodiment, QT 601 may be implemented on a single machine (e.g., as depicted in FIG. 6). In some embodiments, QT 601 may be a combination of a client component and a server component. In some embodiments QT 601 may be executed entirely on the client device(s) 640. Alternatively, some portion of QT 601 may be executed on a client computing device while another portion of QT 601 may be executed on server machine 630.

Figure 7:
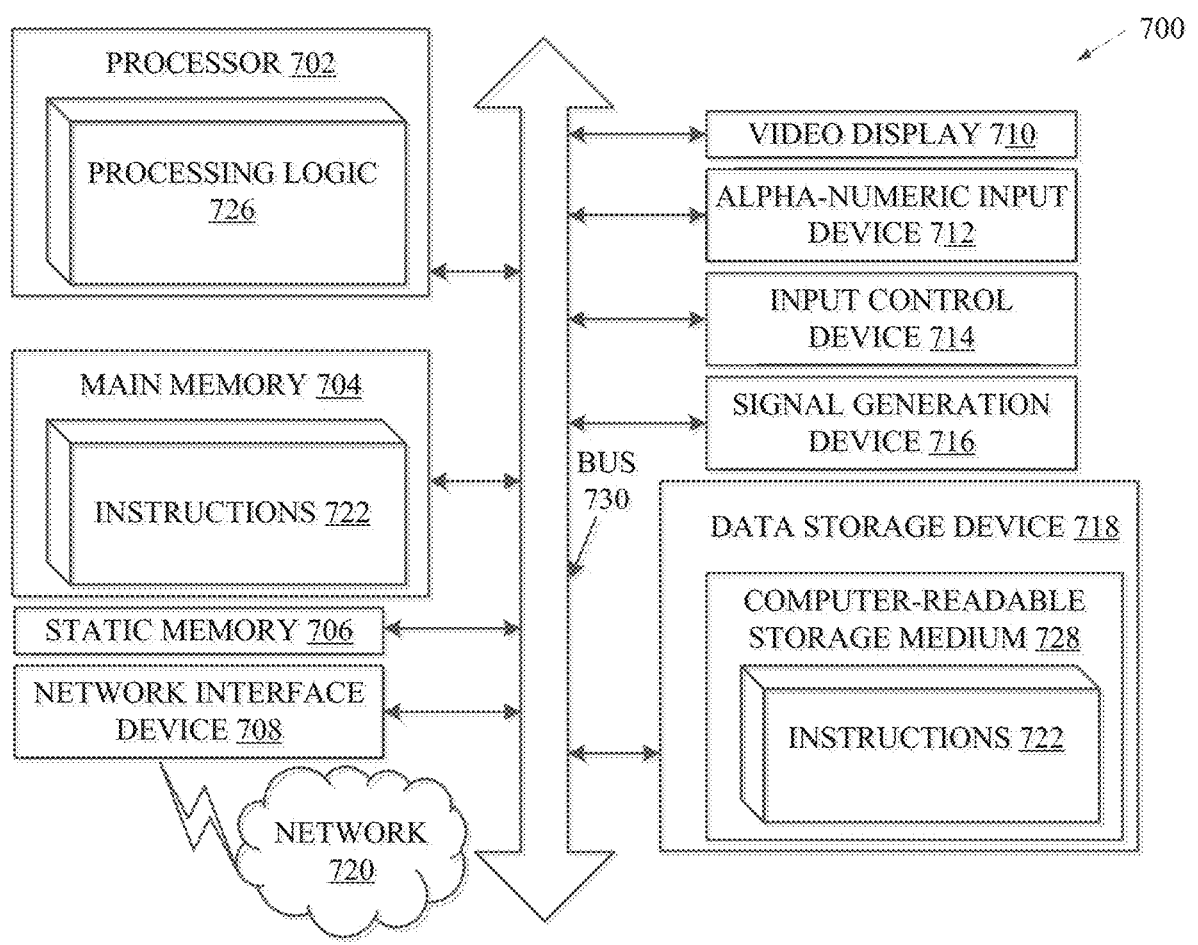
FIG. 7 depicts a block diagram of an example processing device operating in accordance with implementations of the present disclosure.

FIG. 7 illustrates an embodiment of a diagrammatic representation of a computing device and/or processing device 700 associated with a substrate manufacturing system. In one implementation, the processing device 700 may be a part of any device or system of FIG. 1, or any combination thereof. Example processing device 700 may be connected to other processing devices in a LAN, an intranet, an extranet, and/or the Internet. The processing device 700 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 700 may include a processor 702 (e.g., a CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processor 702 represents one or more general-purpose processing devices such as a microprocessor, central processing unit, or the like. More particularly, processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 702 may be configured to execute instructions.

Example processing device 700 may further include a network interface device 708, which may be communicatively coupled to a network 720. Example processing device 700 may further include a video display 710 (e.g., a liquid crystal display (LCD), a touch screen, or a cathode ray tube (CRT)), an alphanumeric input device 712 (e.g., a keyboard), an input control device 714 (e.g., a cursor control device, a touch-screen control device, a mouse), and a signal generation device 716 (e.g., an acoustic speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may include executable instructions.

Executable instructions 722 may also reside, completely or at least partially, within main memory 704 and/or within processor 702 during execution thereof by example processing device 700, main memory 704 and processor 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other embodiment examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first, " "second," "third," "fourth," etc. as used herein are meant as labels to distinguish among different elements and may not necessarily have an ordinal meaning according to their numerical designation.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. The essential elements of a digital computer a central processing unit for performing or executing instructions and one or more memory devices for storing instructions and digital data. The central processing unit and the memory can be supplemented by, or incorporated in, special purpose logic circuitry or quantum simulators. Generally, a digital computer will also include, or be operatively coupled to receive digital data from or transfer digital data to, or both, one or more mass storage devices for storing digital data, e.g., magnetic, magneto-optical disks, optical disks, or systems suitable for storing information. However, a digital computer need not have such devices.

Digital computer-readable media suitable for storing digital computer program instructions and digital data include all forms of non-volatile digital memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks.

Control of the various systems described in this specification, or portions of them, can be implemented in a digital computer program product that includes instructions that are stored on one or more non-transitory machine-readable storage media, and that are executable on one or more digital processing devices. The systems described in this specification, or portions of them, can each be implemented as an apparatus, method, or system that may include one or more digital processing devices and memory to store executable instructions to perform the operations described in this specification.

While this specification contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
providing, for presentation on each of a plurality of client devices participating in a virtual meeting, a user interface (UI) during the virtual meeting, wherein the UI comprises a plurality of visual items each corresponding to one of a plurality of participants, wherein each of the plurality of participants has a participant role, and wherein one of the visual items comprises an avatar of a virtual assistant represented as having the participant role;
providing, via the UI during the virtual meeting, a communication of a first participant of the plurality of participants, wherein the communication of the first participant corresponds to a task associated with the virtual assistant;
detecting, based on an additional communication of one or more of the plurality of participants, an impasse among the plurality of participants regarding resolution of the task;
identifying one or more operations that can be performed by the virtual assistant to resolve the impasse of the additional communication; and
providing, via the UI during the virtual meeting and based on a performance of the one or more operations, a response of the virtual assistant to the communication of the first participant, wherein the response of the virtual assistant is at least one of a textual response or an audio response.

2. The method of claim 1, wherein the communication of the first participant comprises a phrase spoken by one or more of the plurality of participants or a text message entered by the one or more of the plurality of participants in the UI.

3. The method of claim 2, wherein the phrase or the text message has one of one or more predefined prompt formats.

4. The method of claim 2, wherein the phrase or the text message includes content associated with an inferred prompt.

5. The method of claim 1, wherein the task associated with the virtual assistant comprises at least one of:
preparation of meeting minutes,
preparation of a meeting summary,
generating tasks out of action items,
booking a follow-up meeting,
storing meeting notes for later reference,
retrieving meeting notes of a previous virtual meeting,
presenting a document, or
generating a response to one or more questions.

6. The method of claim 5, wherein the response of the virtual assistant is at least one of a response to the one or more questions, a follow-up question related to the one or more questions, or a confirmation that the task associated with the virtual assistant has been performed.

7. A method, comprising:
generating, during a virtual meeting, one or more media transcriptions of a plurality of media streams generated by one or more client devices associated with a plurality of participants of a virtual meeting, wherein a media transcription of the one or more media transcriptions comprises a communication of a participant of the plurality of participants of the virtual meeting;
based on the one or more media transcriptions and during the virtual meeting, determining that the communication of the participant of the plurality of participants corresponds to a task associated with a virtual assistant;
detecting, based on an additional communication of one or more of the plurality of participants, an impasse among the plurality of participants regarding resolution of the task;
identifying one or more operations associated that can be performed by the virtual assistant to resolve the impasse of the additional communication;
providing, during the virtual meeting, the communication and an indication of the identified one or more operations as input to a generative AI model, wherein the generative AI model is trained to perform a plurality of operations associated with generating at least one of content or an instruction pertaining to a virtual meeting;
obtaining an output of the generative AI model; and
providing a response to the indicated request during the virtual meeting using the output of the generative AI model.

8. The method of claim 7, wherein the communication of the participant comprises a phrase spoken by the participant or a text message entered by the participant.

9. The method of claim 8, wherein the phrase or the text message has one of one or more predefined prompt formats.

10. The method of claim 8, wherein the phrase or the text message includes content associated with an inferred prompt.

11. The method of claim 7, wherein the task associated with the virtual assistant comprises at least one of:
preparation of meeting minutes,
preparation of a meeting summary,
generating tasks out of action items,
booking a follow-up meeting,
storing meeting notes for later reference, retrieving meeting notes of a previous virtual meeting,
presenting a document, or
generating a response to one or more questions.

12. The method of claim 7, wherein providing the communication as input to a generative AI model comprises:
forming an input data by combining the communication with a portion of the one or more media transcriptions, wherein the portion of the one or more media transcriptions comprises communications of the plurality of participants of the virtual meeting up until a point in time that the communication indicating a request is received,
wherein the input data is provided as the input to the generative AI model.

13. The method of claim 11, wherein the response to the indicated request is at least one of a response to the one or more questions, a follow-up question related to the one or more questions, or a confirmation that the task associated with the virtual assistant has been performed.

14. The method of claim 7, wherein the generative AI model has been trained on a corpora of text to create a foundation model.

15. The method of claim 7, wherein the generative AI model has been fine-tuned on proprietary organizational data.

16. The method of claim 7, wherein the generative AI model has been fine-tuned for application to a virtual meeting.

17. The method of claim 7, further comprising:
associating each media transcription of the one or more media transcriptions with a metadata comprising:
a time-stamp indicative of when the communication associated with the media transcription was received; and
a participant identifier identifying a participant of the plurality of participants that provided the communication associated with the media transcription; and
storing a meeting transcript comprising the one or more media transcriptions and the metadata to a memory device.

18. A method comprising:
obtaining a meeting transcript comprising one or more media transcriptions of a plurality of media streams generated by one or more client devices associated with a plurality of participants of a virtual meeting;
determining a semantic meaning associated with at least one media transcription of the one or more media transcriptions of the obtained meeting transcript;
generating, based on the determined semantic meaning, a prompt for a generative artificial intelligence (AI) model trained to perform a plurality of operations associated with generating at least one of content or an instruction pertaining to a virtual meeting, wherein the prompt comprises one or more instructions to be executed by AI model in accordance with at least one of the plurality of operations pertaining to the virtual meeting;
providing, as input to the generative AI model, at least a portion of the meeting transcript and the generated prompt; and
obtaining an output of the generative AI model, the output comprising a result of at least one performed operation from the plurality of operations pertaining to the virtual meeting.

19. The method of claim 18, wherein the at least one performed operation comprises at least one of: generating a summarization of the one or more media transcriptions, generating meeting minutes from the one or more media transcriptions, or suggesting future tasks based on the one or more media transcriptions.

20. The method of claim 18, wherein the performed operation is at least one of:
preparation of meeting minutes,
preparation of a meeting summary,
generating tasks out of action items,
booking a follow-up meeting,
storing meeting notes for later reference,
retrieving meeting notes of a previous virtual meeting,
presenting a document, or
generating a response to one or more questions.

21. The method of claim 18, wherein the result of the performed operation comprises at least one of: a summarization of the one or more media transcriptions, meeting minutes from the one or more media transcriptions, or suggested future tasks based on the one or more media transcriptions.

22. The method of claim 18, wherein the generative AI model has been pre-trained on a corpora of text to create a foundation model.

23. The method of claim 18, wherein the generative AI model has been fine-tuned on proprietary organizational data.

24. The method of claim 18, wherein the generative AI model has been fine-tuned for application to a virtual meeting.

25. A method comprising:
receiving, from a client device of a user, a communication indicating a request to perform an operation relating to a virtual meeting;
obtaining a meeting transcript comprising a plurality of media transcriptions generated from a plurality of media streams provided by one or more client devices associated with a plurality of participants of the virtual meeting;
determining a semantic meaning associated with at least one media transcription of the plurality of media transcriptions of the obtained meeting transcript;
generating, based on the determined semantic meaning, a prompt indicative of a request pertaining to the at least one media transcription for a generative artificial intelligence (AI) model, wherein the generative AI model is trained to perform a plurality of operations associated with generating at least one of content or an instruction pertaining to the virtual meeting, at least one of the plurality of operations corresponding to the request indicated by the communication;
providing the generated prompt as an input to the generative AI model;
obtaining an output of the generative AI model; and
providing a response to the indicated request using the output of the generative AI model.

26. The method of claim 25, wherein obtaining a meeting transcript further comprises:
identifying a meeting identifier within the communication indicating the request to perform the operation relating to a virtual meeting; and
accessing the meeting transcript associated with the meeting identifier at a memory device.

27. The method of claim 26, wherein identifying the meeting identifier within the communication indicating a request comprises:
providing a response to a client device that provided the media stream corresponding to the communication indicating the request, the response comprising an additional request for further information associated with the virtual meeting.

28. The method of claim 26, wherein the meeting identifier comprises at least one of a date, a time, or a meeting subject.

29. The method of claim 25, wherein the generative AI model has been pre-trained on a corpora of text to create a foundation model.

30. The method of claim 25, wherein the generative AI model has been fine-tuned on proprietary organizational data.

31. The method of claim 25, wherein the generative AI model has been fine-tuned for application to a virtual meeting.

\* \* \* \* \*